(12) United States Patent
Lin

(10) Patent No.: US 11,580,591 B2
(45) Date of Patent: Feb. 14, 2023

(54) CLOUD-BASED CYBER SHOPPING MALL SYSTEM

(71) Applicant: NAN YA PLASTICS CORPORATION, Taipei (TW)

(72) Inventor: Fong-Chin Lin, Taipei (TW)

(73) Assignee: NAN YA PLASTICS CORPORATION, Taipei (TW)

( * ) Notice: Subject to any disclaimer, the term of this patent is extended or adjusted under 35 U.S.C. 154(b) by 107 days.

(21) Appl. No.: 17/243,582

(22) Filed: Apr. 29, 2021

(65) Prior Publication Data
US 2021/0406994 A1 Dec. 30, 2021

(30) Foreign Application Priority Data
Jun. 24, 2020 (TW) ................................ 109121481

(51) Int. Cl.
G06Q 30/00 (2012.01)
G06Q 30/0601 (2023.01)
G06N 20/00 (2019.01)

(52) U.S. Cl.
CPC ......... *G06Q 30/0643* (2013.01); *G06N 20/00* (2019.01); *G06Q 30/0633* (2013.01)

(58) Field of Classification Search
CPC ....................... G06Q 30/0643; G06Q 30/0633
USPC ....................................................... 705/27.2
See application file for complete search history.

(56) References Cited

U.S. PATENT DOCUMENTS

| 9,443,263 B1 | 9/2016 | Kim |
| 9,824,391 B2 * | 11/2017 | Glazer ............... G06Q 30/0643 |
| 2002/0093541 A1 | 7/2002 | Schileru-Key |
| 2009/0113349 A1 | 4/2009 | Zohar |

(Continued)

FOREIGN PATENT DOCUMENTS

| JP | 2012234355 A | 11/2012 |
| JP | 20174498 A | 1/2017 |

(Continued)

OTHER PUBLICATIONS

Qiu, Y., Yao, X., & Jiang, T. (2020). An online college student art exhibition app based on virtual reality technology. IOP Conference Series.Materials Science and Engineering, 750(1) doi:https://doi.org/10.1088/1757-899X/750/1/012132 (Year: 2020).*

*Primary Examiner* — Marissa Thein
*Assistant Examiner* — Arielle E Weiner
(74) *Attorney, Agent, or Firm* — Li & Cai Intellectual Property Office

(57) ABSTRACT

A cloud-based cyber shopping mall system is provided. The cloud-based cyber shopping mall system includes a cloud-based server module, a scene movement module, a product introduction module, a customer service module, a shopping cart module, a style change module, and an exhibition area switching module. The cloud-based server module includes a cloud-based database and a cloud-based shopping mall webpage. Through the scene movement module, the product introduction module, the customer service module, and the shopping cart module, a user can click on related options adjacent to any product viewed on the cloud-based shopping mall webpage to view an introduction of the product, contact the customer service, and place an order. Through the style change module, the user can change a style of a three-dimensional product model on the cloud-based shopping mall webpage.

9 Claims, 14 Drawing Sheets

(56) References Cited

U.S. PATENT DOCUMENTS

| | | | |
|---|---|---|---|
| 2011/0208619 A1* | 8/2011 | Siounis | G06Q 30/0643 |
| | | | 705/27.2 |
| 2016/0210602 A1* | 7/2016 | Siddique | G06Q 20/321 |
| 2016/0292966 A1 | 10/2016 | Denham | |
| 2017/0061527 A1* | 3/2017 | Vakilian | G06T 7/70 |
| 2017/0278180 A1* | 9/2017 | Landry | G06Q 30/08 |
| 2019/0272585 A1 | 9/2019 | Milicevic | |
| 2020/0249819 A1* | 8/2020 | Berquam | G06T 19/006 |

FOREIGN PATENT DOCUMENTS

| | | | |
|---|---|---|---|
| JP | 2018180803 A | | 11/2018 |
| JP | 2019160112 A | | 9/2019 |
| WO | WO-2020168792 A1 * | | 8/2020 |

* cited by examiner

CLOUD-BASED CYBER SHOPPING MALL SYSTEM

CROSS-REFERENCE TO RELATED PATENT APPLICATION

This application claims the benefit of priority to Taiwan Patent Application No. 109121481, filed on Jun. 24, 2020. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a cyber shopping mall system, and more particularly to a cloud-based cyber shopping mall system that provides users with experiences similar to visiting an offline trade show.

BACKGROUND OF THE DISCLOSURE

When the supply of earlier processed plastic products did not meet demands, plastic processors can profit greatly from producing and selling products through a basic distribution business. Such business approach can be referred to as being "production-oriented (i.e., business 1.0)". The "production-oriented" business approach underwent a huge change when a large number of competitors entered the market at the same time, which nearly saturated the market demand, and the processing technology became more and more mature. The plastic processors could no longer rely on the "production-oriented" business approach to obtain the same profit, therefore, some of the plastic processors have turned the business approach into being "market-oriented (i.e., business 2.0)" in order to maintain the same profit.

However, with the coming of globalization, the competition in the plastic processing market has intensified. Therefore, plastic processors must transform products into high-value products, cease to produce products that lack business benefits and prospects, and invest into the development and expansion of high-value products that have high quality, high prices, and high benefits without pursuing the expansion of production volume. The plastic processors are required to turn the business approach into being "business-oriented (i.e., business 3.0)". For example, Nan Ya Plastics Corporation has successfully achieved outstanding business results by applying the business 3.0 approach in 2016, despite poor domestic business environment. Moving forward, Nan Ya Plastics Corporation is prepared to move toward the "forward-oriented (business 4.0)" business approach.

"Forward-oriented (business 4.0)" is a business model that predicts the future development of the industry through aspects such as business, research and development, and production. The business model cooperates with industry 4.0 and cyber methods to connect employees, clients, material suppliers, equipment manufacturers, and the company together. Instantaneous and borderless data of the Internet is used in conjunction with data that are analyzed, so as to generate a model that helps decision makers make forward-looking decisions. Therefore, how an intelligent "cyber physical system" can be built to turn around the gross margin of low margin products and expand the sales volume and market responsiveness of high margin products has become one of the important issues that traditional plastic processors are currently faced with.

Most common ways to sell plastic processing products are to participate in large-scale domestic and international trade shows to reach potential customers. In common large-scale trade shows, participating businesses are required to rent an exhibition area, arrange for plane tickets, and accommodations in advance so as to exhibit products at the specific exhibition area in a specific exhibition period. Similarly, for buyers and visitors, they also have to arrange for plane tickets and accommodations in advance to visit the exhibition area in the specific exhibition period to see the products provided by the exhibitors. Therefore, the common large-scale trade shows require a lot of manpower and resources from exhibitors, buyers and visitors alike.

Existing product webpages produced by the plastic processors only present descriptions and images of the products in a static manner, so that webpage visitors cannot have a same experience of exploring through the products on the product webpages as if they were at the trade show, and the purchasing, price inquiry or inquiry processes that can be experienced at the trade show cannot be afforded to the webpage visitors on the existing product webpages. Therefore, for the conventional plastic processors who participate in large-scale trade shows, traveling to a specific country every year or every few years to exhibit requires a lot of manpower and resources, but the traditional plastic processors still do so in spite of hardships, since participation in such exhibitions is the only way to reach a large number of potential buyers.

According to the above, it has become one of the important issues for the traditional plastic processors to improve on the inconveniences caused by participating in large-scale domestic and foreign trade shows to reach potential customers by using the "forward-oriented (business 4.0)" approach with industry 4.0 and cyber methods.

SUMMARY OF THE DISCLOSURE

In response to the above-referenced technical inadequacies, the present disclosure provides a cloud-based cyber shopping mall system to improve on the issue in which manufactures are required to spend a lot of manpower and resources to participate in trade shows held in a specific country in order to easily reach a large number of potential buyers.

In one aspect, the present disclosure provides a cloud-based cyber shopping mall system that includes a cloud-based server module, a scene movement module, a style change module, an exhibition area switching module, a shopping cart module, a product introduction module, a magnification module, and a customer service module. The cloud-based server module includes a cloud-based database and a cloud-based shopping mall webpage, the cloud-based database stores a plurality of exhibition area panoramic photographs, each of the exhibition area panoramic photographs is pieced together from a plurality of scene photographs, and each of the scene photographs includes at least one preset product and at least one preset introductory description. The cloud-based server module allows an electronic apparatus of one of a plurality of users to be connected thereto, so that the electronic apparatus displays the cloud-based shopping mall webpage, and the cloud-based shopping mall webpage presents a portion of the scene photographs and at least one three-dimensional (3D) product model of one of the exhibition area panoramic photographs. The 3D product model adjustment module is used to detect operations of the one of the plurality of users on the electronic apparatus, so as to change an angle of the at least one 3D product model presented on the cloud-based shopping mall webpage. The scene movement module is used to detect the operations of the one of the plurality of users on the electronic apparatus to change at least one of the scene photographs in the one of the exhibition area panoramic photographs presented on the cloud-based shopping mall webpage, and to correspondingly change or move a position of the at least one 3D product model. The style change module is used to detect the operations of the one of the plurality of users on the electronic apparatus to change a style of one of the at least one 3D product model. The exhibition area switching module is used to detect the operations of the one of the plurality of users on the electronic apparatus to replace the one of the exhibition area panoramic photographs and the at least one 3D product model that are presented on the cloud-based shopping mall webpage. The shopping cart module is used to detect the operations of the one of the plurality of users on the electronic apparatus, so that an order form corresponding to one of the at least one preset product or the one of the at least one 3D product model is displayed on the cloud-based shopping mall webpage. The product introduction module is used to detect the operations of the one of the plurality of users on the electronic apparatus, so that at least one of a text introduction, a webpage link, or a product production video corresponding to the one of the at least one preset product or the one of the at least one 3D product model is displayed on the cloud-based shopping mall webpage. The magnification module is used to detect the operations of the one of the plurality of users on the electronic apparatus, so that one of a clear text pre-stored in the cloud-based database and a clear image pre-stored in the cloud-based database corresponding to the at least one preset introductory description is displayed on the cloud-based shopping mall webpage. The customer service module is used to detect the operations of the one of the plurality of users on the electronic apparatus, so that at least one of a dealer contact information, or an online customer service link corresponding to the one of the at least one preset product or the one of the at least one 3D product model is displayed on the cloud-based shopping mall webpage.

In conclusion, the cloud-based cyber shopping mall system of the present disclosure allows potential buyers from around the world to view a trade show exhibition online that is equal to an offline counterpart through the cloud-based shopping mall webpage. The cloud-based cyber shopping mall system allows the user to change a color or texture of a 3D product model according to user requirements when the user views any of the 3D product models presented on the cloud-based shopping mall webpage, and the cloud-based cyber shopping mall system allows the user to directly place an order, view detailed product introduction, obtain dealer contact information or instantly contact online customer service when the user views any of the preset product or any of the 3D product models presented on the cloud-based shopping mall webpage. Therefore, the cloud-based cyber shopping mall system of the present disclosure provides users with an experience equal to visiting an offline trade show.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
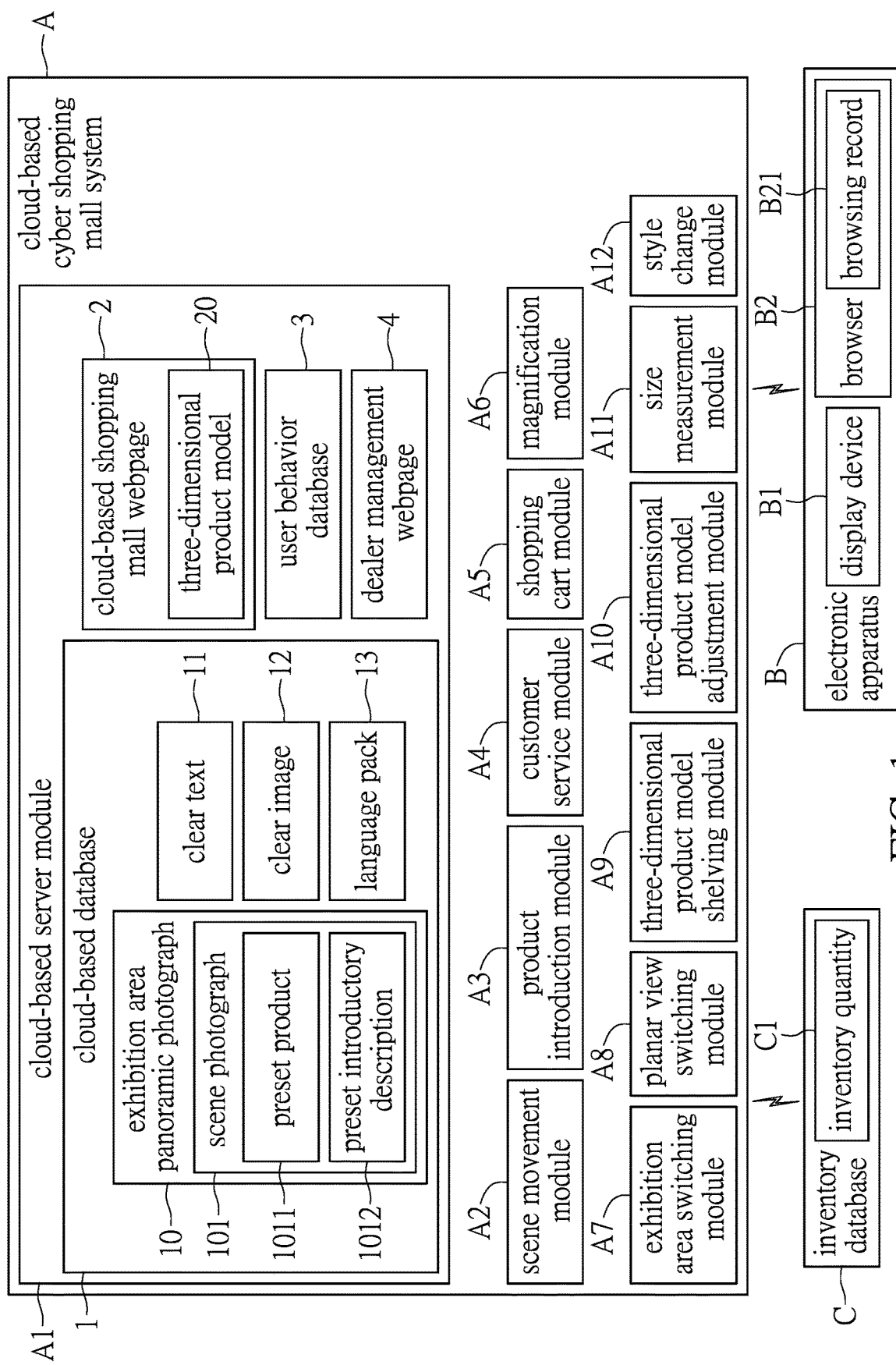
FIG. 1 is a schematic block diagram of a cloud-based cyber shopping mall system according to a first embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

In the following descriptions, reference is made to a particular drawing or as shown in the particular drawing only to emphasize that most of the relevant content described in subsequent description appears in the particular drawing, and does not limit the subsequent description to reference only to the particular drawing.

Referring to FIG. 1, FIG. 1 is a schematic block diagram of a cloud-based cyber shopping mall system according to a first embodiment of the present disclosure. The cloud-based cyber shopping mall system A of the present disclosure includes a cloud-based server module A1, a scene movement module A2, a product introduction module A3, a customer service module A4, a shopping cart module A5, a magnification module A6, an exhibition area switching module A7, a planar view switching module A8, a three-dimensional (3D) product model shelving module A9, a 3D product model adjustment module A10, a size measurement module A11, and a style change module A12.

The cloud-based server module A1 includes a cloud-based database 1 and a cloud-based shopping mall webpage 2, the cloud-based database 1 stores a plurality of exhibition area panoramic photographs 10, each of the exhibition area panoramic photographs 10 is pieced together from a plurality of scene photographs 101, and each of the scene photographs 101 includes at least one preset product 1011 and at least one preset introductory description 1012. The scene photographs 101 refer to photographs of physical products taken using a camera, and the preset introductory description 1012 is a description and introduction text (which can be various descriptive documents, etc.) configured adjacent to the physical products.

The cloud-based server module A1 allows an electronic apparatus B (e.g., a notebook computer, a desktop computer, a tablet computer, or a mobile phone, etc.) of a user to be connected thereto, so that the electronic apparatus B displays the cloud-based shopping mall webpage 2, and the cloud-based shopping mall webpage 2 presents a portion of the scene photographs 101 and at least one 3D product model 20 of one of the exhibition area panoramic photographs 10. Specifically, the exhibition area panoramic photographs 10 and the scene photographs 101 can be obtained by using a 360-degree panoramic camera equipment to take photographs of a physical exhibition area, while the 3D product model 20 is a 3D model of the physical product built by manufacturers using 3D drawing software.

Figure 2:
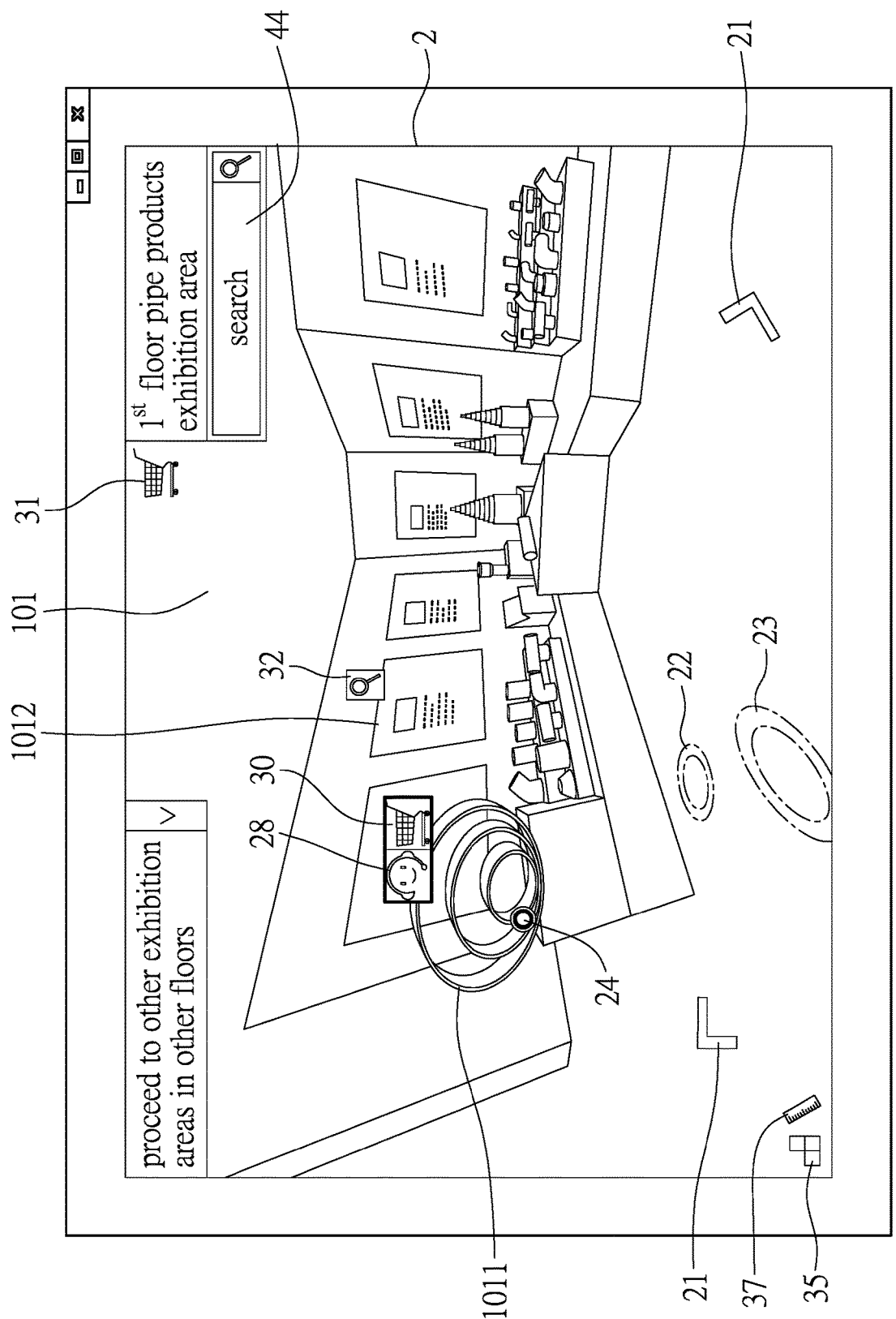
FIG. 2 to FIG. 13 are schematic views of changes of the cloud-based cyber shopping mall system respectively corresponding to operations of a user according to the first embodiment of the present disclosure.

As shown in FIGS. 1 and 2, the scene movement module A2 is used to detect operations of the user on the electronic apparatus B to change at least one of the scene photographs 101 in the one of the exhibition area panoramic photographs 10 presented on the cloud-based shopping mall webpage 2, and to correspondingly change or move a position of the at least one 3D product model 20. In practical applications, the cloud-based shopping mall webpage 2 can include at least one guiding mark 21 (an arrow pattern is exemplified in the figures, but is not limited thereto), and the scene movement module A2 can determine which one of the at least one guiding mark 21 currently displayed is clicked by the user through the electronic apparatus B, and update the at least one scene photographs 101 presented on the cloud-based shopping mall webpage 2 accordingly. From a perspective view of the user that operates it, when the user browses the cloud-based shopping mall webpage 2, he or she can see a portion of the exhibition area panoramic photographs 10 and the at least one guiding mark 21 on a webpage picture, and when the user clicks on one of the guiding marks 21, the webpage picture is changed, so that the user can feel as if they are walking in the physical exhibition area. In short, the cloud-based shopping mall webpage 2 of the present disclosure can provide the user with a virtual reality (VR) navigation experience.

In a preferable embodiment, when the scene movement module A2 determines that a distance difference between one of the scene photographs 10 clicked by the user on the electronic apparatus B and another one of the scene photographs 101 displayed on a center position of a display device B1 of the electronic apparatus B is greater than a threshold value, the scene movement module A2 reduces the speed at which the cloud-based shopping mall webpage 2 replaces at least one of the scene photographs 101. Specifically, in a common VR navigation, when the user wants to proceed to a relatively distant location in the VR image, an image is changed rapidly, and the user watching the rapid change process may feel uncomfortable. Therefore, the cloud-based cyber shopping mall system A of the present disclosure uses the scene movement module A2 to detect whether or not the user wants to proceed to a distant location in the VR image. If the scene movement module A2 determines that the user wants to proceed to a distant location in the VR image, the scene movement module A2 reduces a switch speed of the image presented on the cloud-based shopping mall webpage 2, so that the user can avoid discomfort from the rapid change of the webpage picture.

Accordingly, in different embodiments, the scene movement module A2 can adjust a speed of the cloud-based shopping mall webpage 2 replacing at least one of the scene photographs 101 according to a resolution of a browser B2 of the display device B1 of the electronic apparatus B displaying the cloud-based shopping mall webpage 2 and the distance difference between one of the scene photographs 101 clicked by the user on the electronic apparatus B and another one of the scene photographs 101 displayed on a center position of the display device B1 of the electronic apparatus B, and the speed of the cloud-based shopping mall webpage 2 replacing at least one of the scene photographs 101 is inversely proportional to the resolution of the browser B2 and the distance difference. Specifically, if the user uses a browser B2 with a higher resolution to browse the cloud-based shopping mall webpage 2, the user can view more scene photographs 101 on the cloud-based shopping mall webpage 2. In this manner, the farther a position the user clicks on from a center position of a webpage picture is, the slower a speed the scene movement module A2 switches the webpage picture will be, thereby preventing the user from being uncomfortable due to a rapidly changing webpage picture.

In practical applications, the electronic apparatus B of the user loads the cloud-based shopping mall webpage 2 through the browser B2, and the scene movement module A2 loads a browsing record B21 of the browser B2 to determine whether or not the user has browsed the cloud-based shopping mall webpage 2 before, when it is determined that the user has browsed the cloud-based shopping mall webpage 2 before, based on the browsing record B21, the cloud-based shopping mall webpage is controlled to present the scene photographs 101 and the at least one 3D product model 20 that are last browsed by the user.

Figure 3:
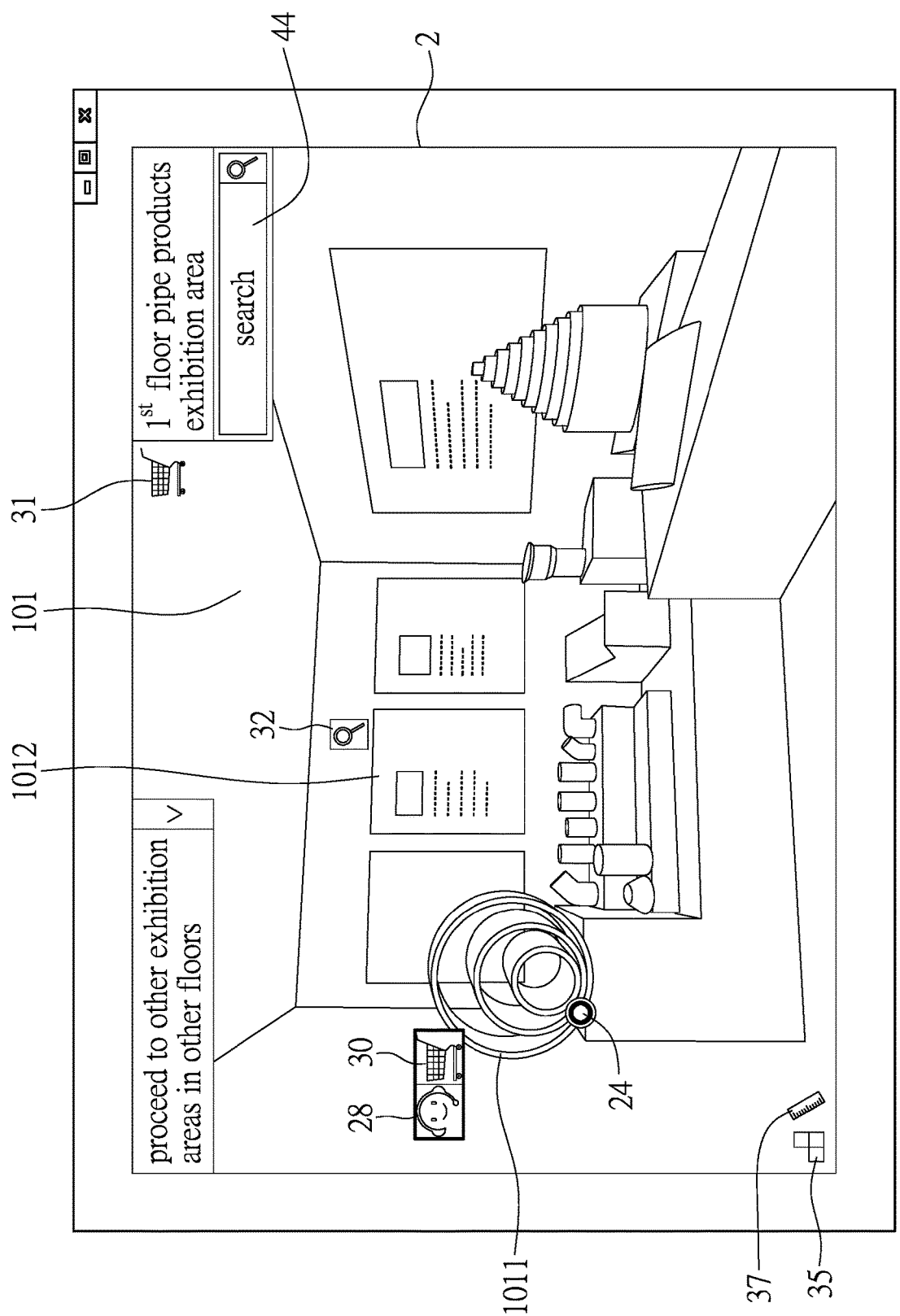

As shown in FIG. 1 to FIG. 3, the scene movement module A2 can also be used to detect the operations of the user on the electronic apparatus B, so that one of the scene photographs 101 of the cloud-based shopping mall webpage 2 is displayed in a substantially center position of the display device B1 of the electronic apparatus B, thereby allowing the user to view a front view of the preset product 1011 of the scene photographs 101. Specifically, as shown in FIG. 2, the cloud-based shopping mall webpage 2 can display an assisting mark 22 adjacent to each of the preset products 1011 (a circular form is exemplified in the figures, but is not limited thereto). When the user moves a cursor 23 (as shown in the figures) to the assisting mark 22 located on the left side of FIG. 2 and clicks on the assisting mark 22, the scene movement module A2 controls the cloud-based shopping mall webpage 2 to change the corresponding scene photographs 101, so that the cloud-based shopping mall webpage 2 is changed from the picture as shown in FIG. 2 to the picture as shown in FIG. 3. Therefore, the user can view the front view of the preset product 1011. In other words, the scene movement module A2 can not only change one of the scene photographs 101 displayed on the cloud-based shopping mall webpage 2 according to the guiding mark 21 clicked by the user, but can also change the angle of the scene photographs 101 displayed on the cloud-based shopping mall webpage 2 according to the assisting mark 22 clicked by the user, so that the user can view the front view of the preset product 1011 in the scene photographs 101.

Figure 4:
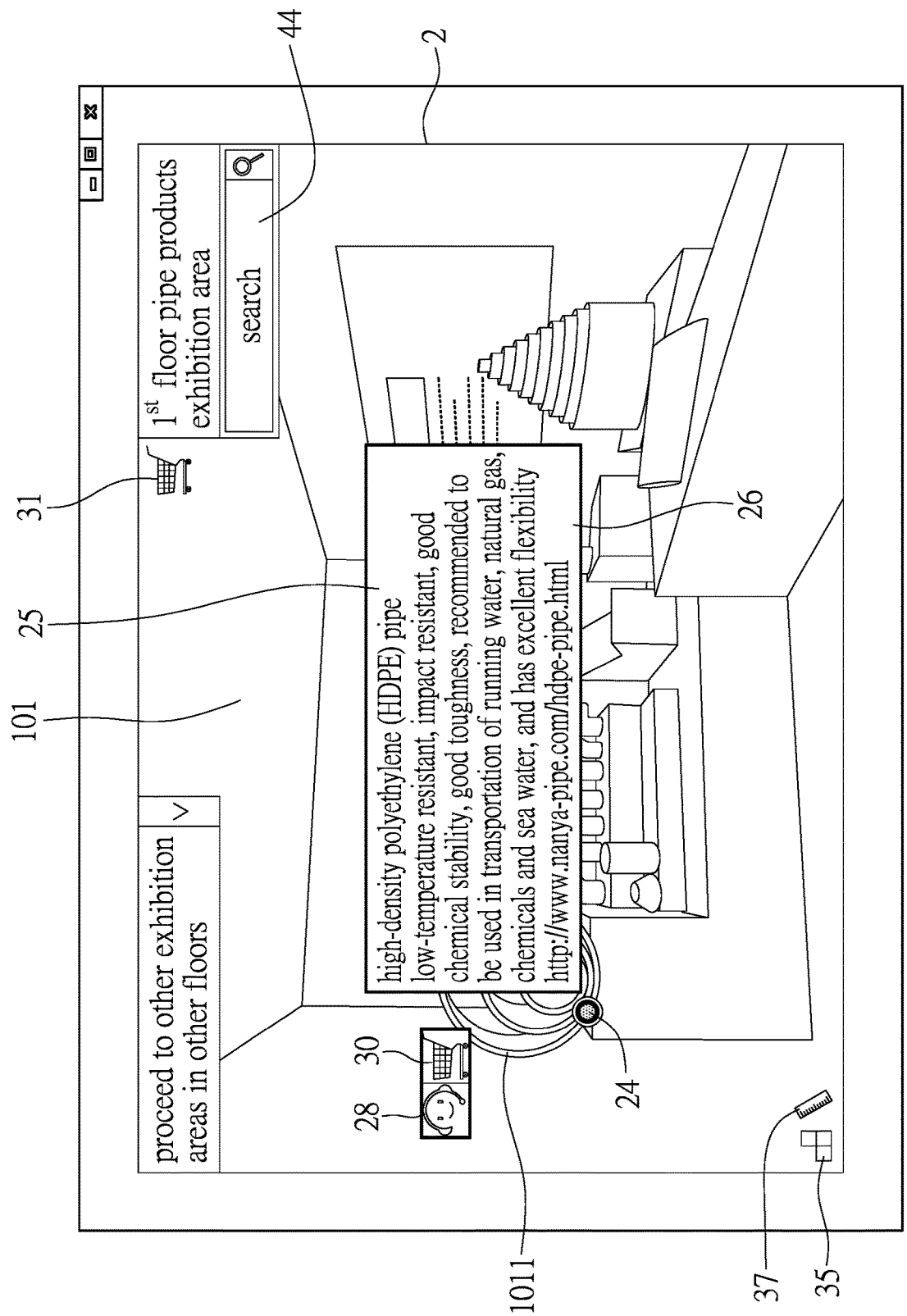
Figure 5:
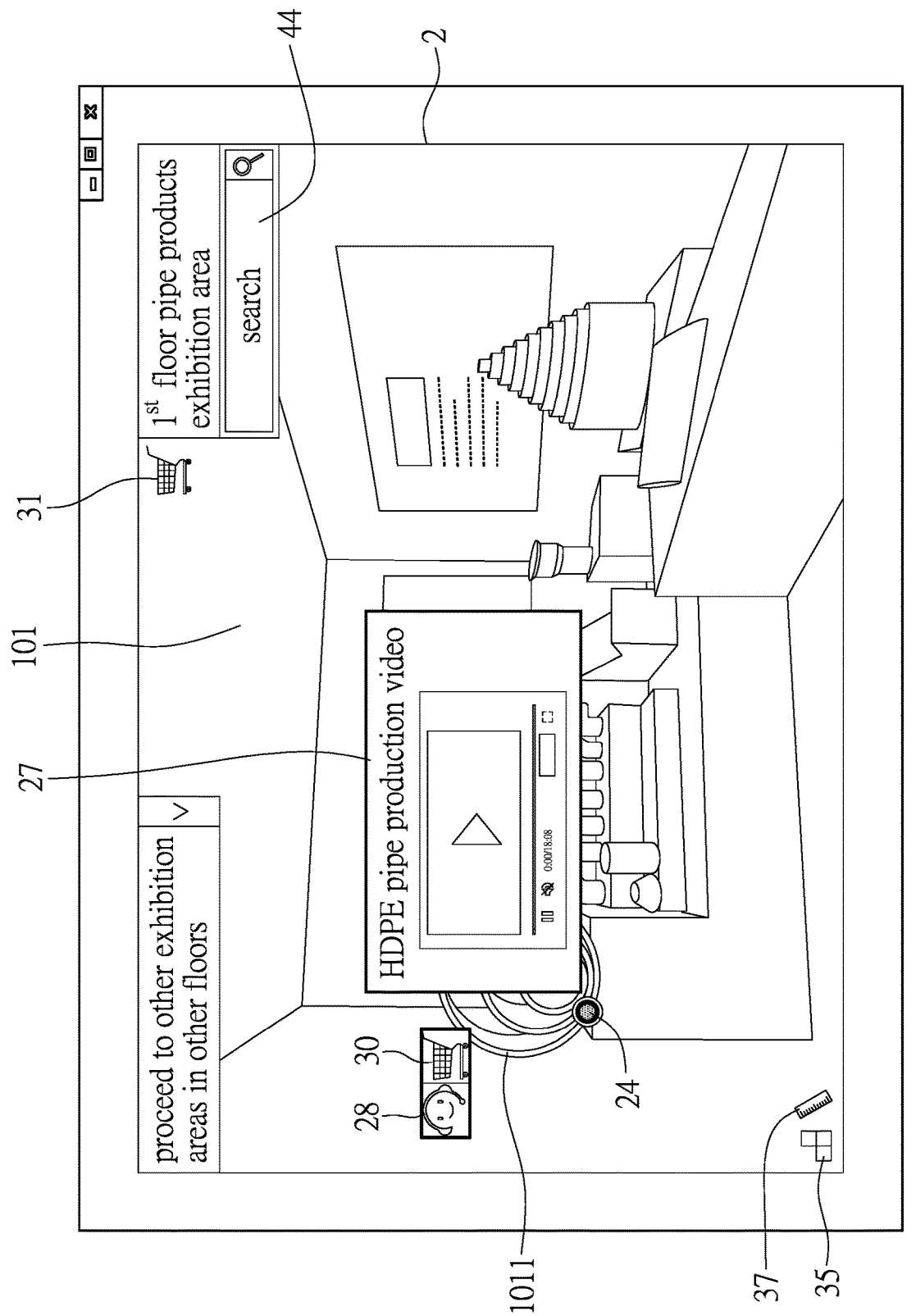

As shown in FIG. 1, FIG. 3, and FIG. 5, the product introduction module A3 is used to detect the operations of the user on the electronic apparatus B, so that at least one of a text introduction 25, a webpage link 26, or a product production video 27 corresponding to the one of the at least one preset product 1011 or the one of the at least one 3D product model 20 is displayed on the cloud-based shopping mall webpage 2. Specifically, the cloud-based shopping mall webpage 2 can have a plurality of product introduction options 24, each of the product introduction options 24 is configured adjacent to the one of the at least one preset product 1011 or the one of the at least one 3D product model 20 in the scene photographs 101 currently displayed by the cloud-based shopping mall webpage 2, and according to one of the product introduction options 24 selected by the user on the electronic apparatus B, the product introduction module A3 enables the cloud-based shopping mall webpage 2 to display at least one of the corresponding text introduction 25 (as shown in FIG. 4), the webpage link 26 (as shown in FIG. 4), and the product production video 27 (as shown in FIG. 5) on the cloud-based shopping mall webpage 2. It is worth mentioning that the product introduction module A3 enables the cloud-based shopping mall webpage 2 to display the product production video 27 of the preset product 1011 to assist the user to more clearly and directly understand the actual production process of the product, so that a willingness to purchase of the user is increased. In practice, when the user clicks on one of the product introduction options 24 on the cloud-based shopping mall webpage 2, the cloud-based shopping mall webpage 2 can also display the text introduction 25, the webpage link 26 and the product production video 27 at the same time.

Figure 6:
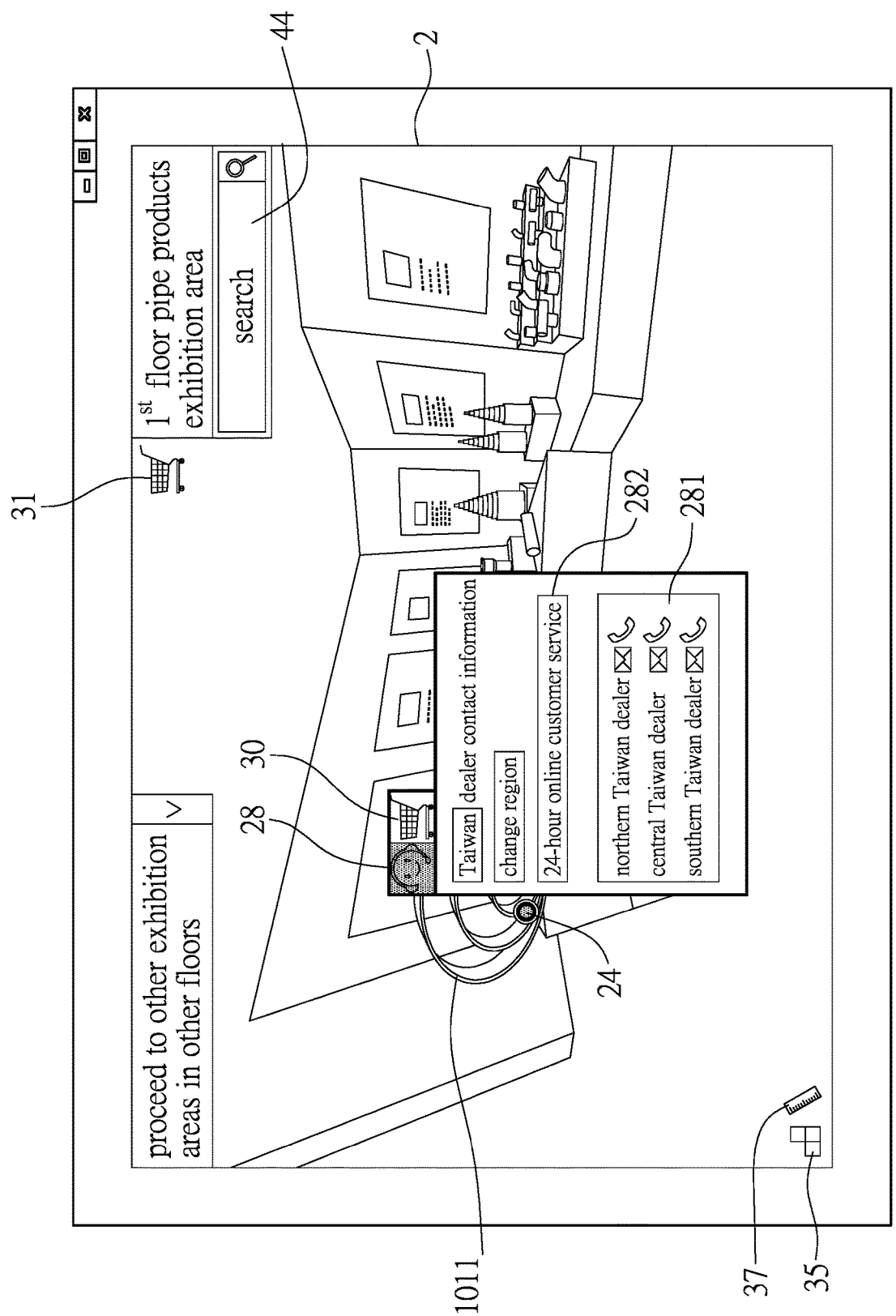

According to FIG. 1 and FIG. 6, the customer service module A4 is used to detect the operations of the user on the electronic apparatus B, so that at least one of a dealer contact information 281, or an online customer service link 282 corresponding to the one of the at least one preset product 1011 or the one of the at least one 3D product model 20 is displayed on the cloud-based shopping mall webpage 2. Specifically, the cloud-based shopping mall webpage 2 has a plurality of customer service options 28, each of the customer service options 28 is configured adjacent to the one of the at least one preset products 1011 or the one of the at least one 3D product models 20 of the plurality of scene photographs 101 displayed on the cloud-based shopping mall webpage 2, and according to one of the customer service options 28 selected by the user on the electronic apparatus B, the customer service module A4 enables the cloud-based shopping mall webpage 2 to display at least one of the corresponding dealer contact information 281 or the online customer service link 282. When the user clicks on one of the customer service options 28 on the cloud-based shopping mall webpage 2, the cloud-based shopping mall webpage 2 displays the corresponding dealer contact information 281 and the online customer service link 282 for the preset product 1011, so that the user can obtain the telephone number, e-mail, etc., of the dealer of the preset product 1011 by viewing the dealer contact information 281. Alternatively, the user can also directly click on the online customer service link 282 for the "24-hour online customer service" displayed on the cloud-based shopping mall webpage 2 and instantly contact with one of online customer service personnel.

Figure 7:
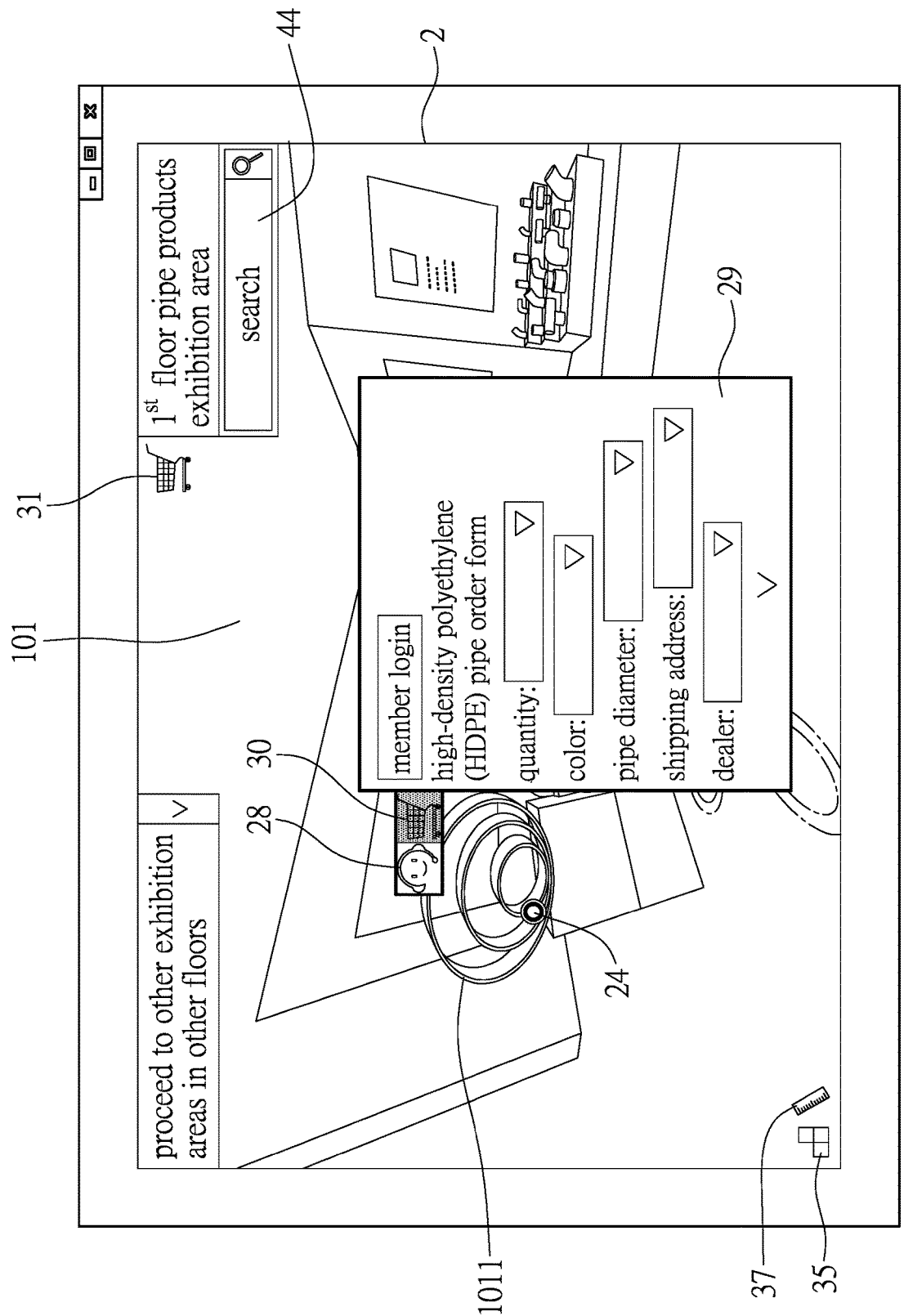

Reference is made to FIG. 1 and FIG. 7. The shopping cart module A5 is used to detect the operations of the user on the electronic apparatus B, so that an order form 29 corresponding to one of the at least one preset product 1011 or the one of the at least one 3D product model 20 is displayed on the cloud-based shopping mall webpage 2. Specifically, the cloud-based shopping mall webpage 2 can have a plurality of shopping cart options 30, and each of the shopping cart options 30 is configured adjacent to one of the at least one preset product 1011 or one of the at least one 3D product model 20 of the plurality of scene photographs 101 currently displayed by the cloud-based shopping mall webpage 2, and according to one of the shopping cart options 30 selected by the user on the electronic apparatus B, the shopping cart module 5A enables the cloud-based shopping mall webpage 2 to display the corresponding order form 29. In other words, the user can see one of the shopping cart options 30 adjacent to each of the preset products 1011 in each of the scene photographs 101 on the cloud-based shopping mall webpage 2, and when the user wants to purchase the preset product 1011, the user can click on the adjacent shopping cart option 30, so that the shopping cart module A5 controls the cloud-based shopping mall webpage 2 to display the corresponding order form 29. In actual applications, the order form 29 can also display buttons such as "member login" for the user to choose to log in as a member, and if the user chooses to log in as the member, the cloud-based shopping mall webpage 2 can accordingly display previous order information of the member. Contents of the order form 29 as shown in FIG. 7 are only one of the examples. In practical applications, the contents of the order form 29 can be changed according to requirements, for example, the order form 29 can also include price statistics, product delivery information, etc. In addition, in actual application, the cloud-based shopping mall webpage 2 can also include a total shopping cart option 31. After the user clicks on different shopping cart options 30 and places orders for different preset products 1011, each shopping cart module A5 not only updates corresponding databases, but also updates the total shopping cart option 31 of the cloud-based shopping mall webpage 2, so that the user can clearly understand how many products are purchased. For example, if the user purchased two different products, the user can see a mark of the number "2" in the total shopping cart option 31 on the cloud-based shopping mall webpage 2.

In particular, the cloud-based cyber shopping mall system A of the present disclosure allows the user to view each of the exhibition area panoramic photographs 10 on the cloud-based shopping mall webpage 2 in a VR manner, and when the user views each of the exhibition area panoramic photographs 10 in the VR manner, the customer service option 28 and the shopping cart option 30 are configured adjacent to any of the preset products 1011 that the user sees in the scene photographs 101. Therefore, the user can easily and quickly make inquiries or place orders for any of the preset products 1011 according to requirements when the user views each of the exhibition area panoramic photographs 10 in the VR manner.

Figure 8:
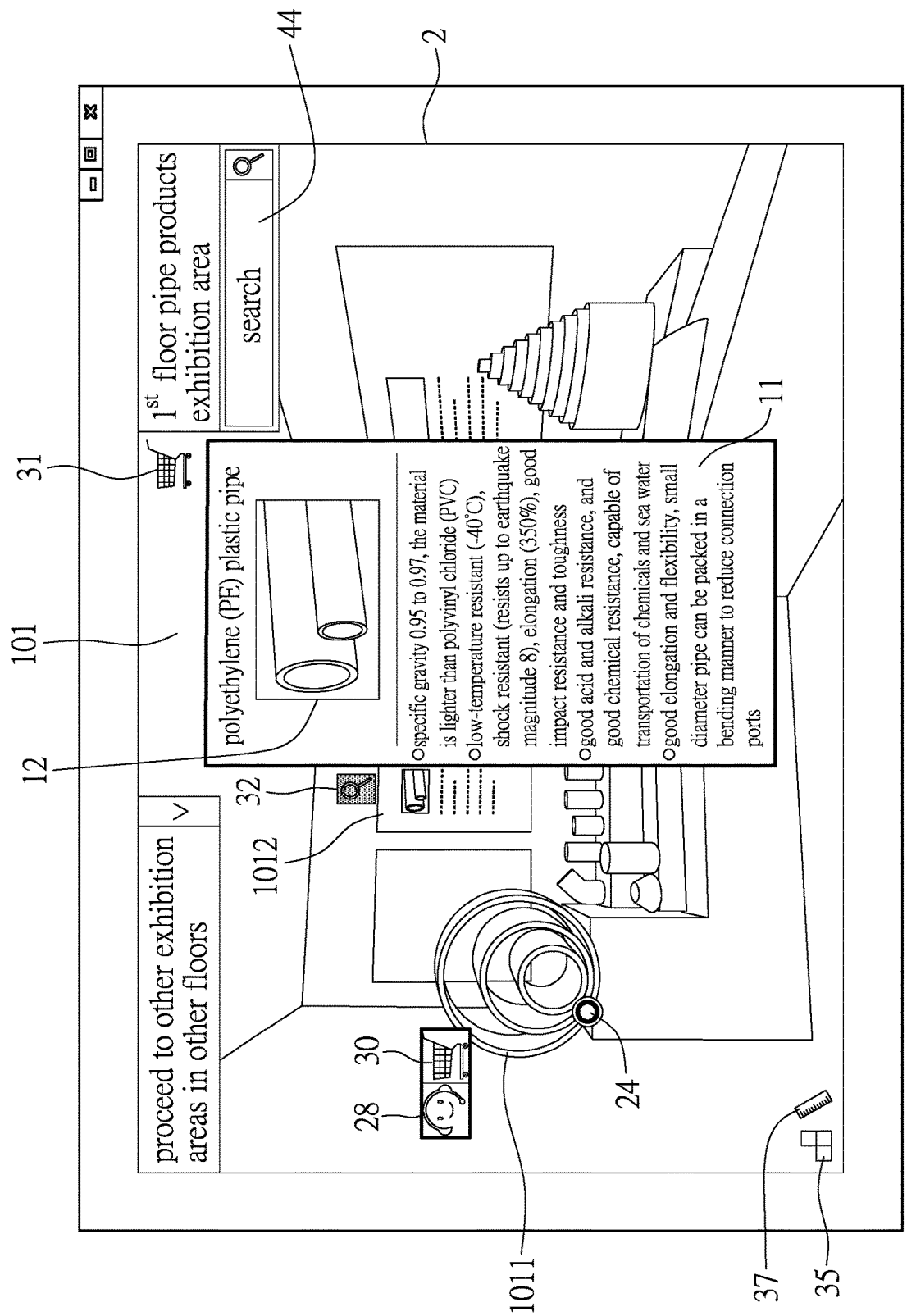

Referring to FIG. 1 and FIG. 8, the magnification module A6 is used to detect the operations of the user on the electronic apparatus B, so that one of a clear text 11 pre-stored in the cloud-based database 1 and a clear image 12 pre-stored in the cloud-based database 1 corresponding to the at least one preset introductory description 1012 is displayed on the cloud-based shopping mall webpage 2. Specifically, the cloud-based shopping mall webpage 2 can have a plurality of magnification options 32, each of the magnification options 32 is configured adjacent to the preset introductory description 1012 of each of the scene photographs 101, and the magnification module A6 enables the cloud-based shopping mall webpage 2 to display the corresponding clear text 11 and the clear image 12 based on the magnification module A6 detecting which one of the magnification options 32 is clicked. In other words, when the user browses the cloud-based shopping mall webpage 2, if the user cannot directly view the preset introductory description 1012 in one of the scene photographs 101 clearly, the user can directly click on the magnification option 32 located adjacent to the preset introductory description 1012, so that the cloud-based shopping mall webpage 2 presents the corresponding clear text 11 and clear image 12 for the user to view.

It should be emphasized that, in existing common VR navigation webpages, in the process of photographing physical scenes to produce panoramic photographs, due to various factors, the user may see a blurred images or text on the webpage, thereby leading to a poor user experience. On the other hand, through the design of the magnification module A6, even if the user sees blurred and unclear text or images on the cloud-based shopping mall webpage 2, the cloud-based cyber shopping mall system A of the present disclosure enables the user to directly click on the adjacent magnification option 32, so that the cloud-based shopping mall webpage 2 accordingly presents a relatively clear text and images, thereby allowing the user to have a better experience.

Figure 9:
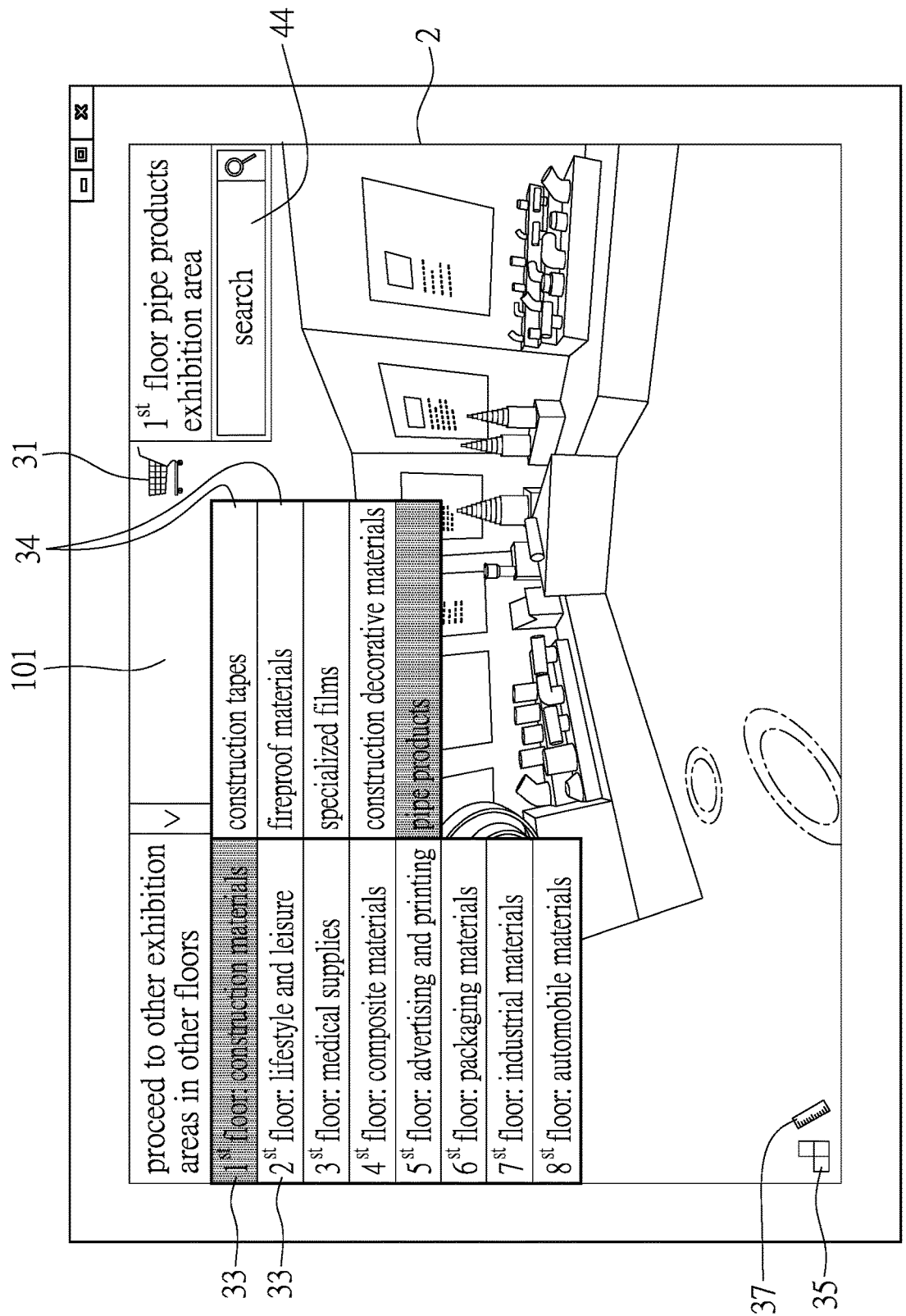

Referring to FIG. 1 and FIG. 9, the exhibition area switching module A7 is used to detect the operations of the user on the electronic apparatus B to replace the one of the exhibition area panoramic photographs 10 and the at least one 3D product model 20 that are presented on the cloud-based shopping mall webpage 2. Specifically, the cloud-based shopping mall webpage 2 includes a plurality of exhibition area options 33, and the exhibition area switching module A7 enables the cloud-based shopping mall webpage 2 to replace the corresponding exhibition area panoramic photographs 10 based on the exhibition area switching module A7 detecting which one of the exhibition area options 33 is clicked. For example, referring to FIG. 9, when the cloud-based shopping mall webpage 2 is applied to the online sale of plastic products, the user can view the following eight exhibition area options 33 on the cloud-based shopping mall webpage 2: "$1^{st}$ floor: construction materials", "$2^{nd}$ floor: lifestyle and leisure", "$3^{rd}$ floor: medical supplies", "$4^{th}$ floor: composite materials", "$5^{th}$ floor: advertising and printing", "$6^{th}$ floor: packaging materials", "$7^{th}$ floor: industrial materials", and "$8^{th}$ floor: automobile materials", furthermore, when the user clicks on the "$1^{st}$ floor: construction materials" exhibition area option 33, the cloud-based shopping mall webpage 2 can further display five exhibition sub-area options 34 of "construction tapes", "fireproof materials", "specialized films", "construction decorative materials" and "pipe products". If the user clicks on the "pipe products", the cloud-based shopping mall webpage 2 then displays the picture as shown in FIG. 2.

Figure 10:
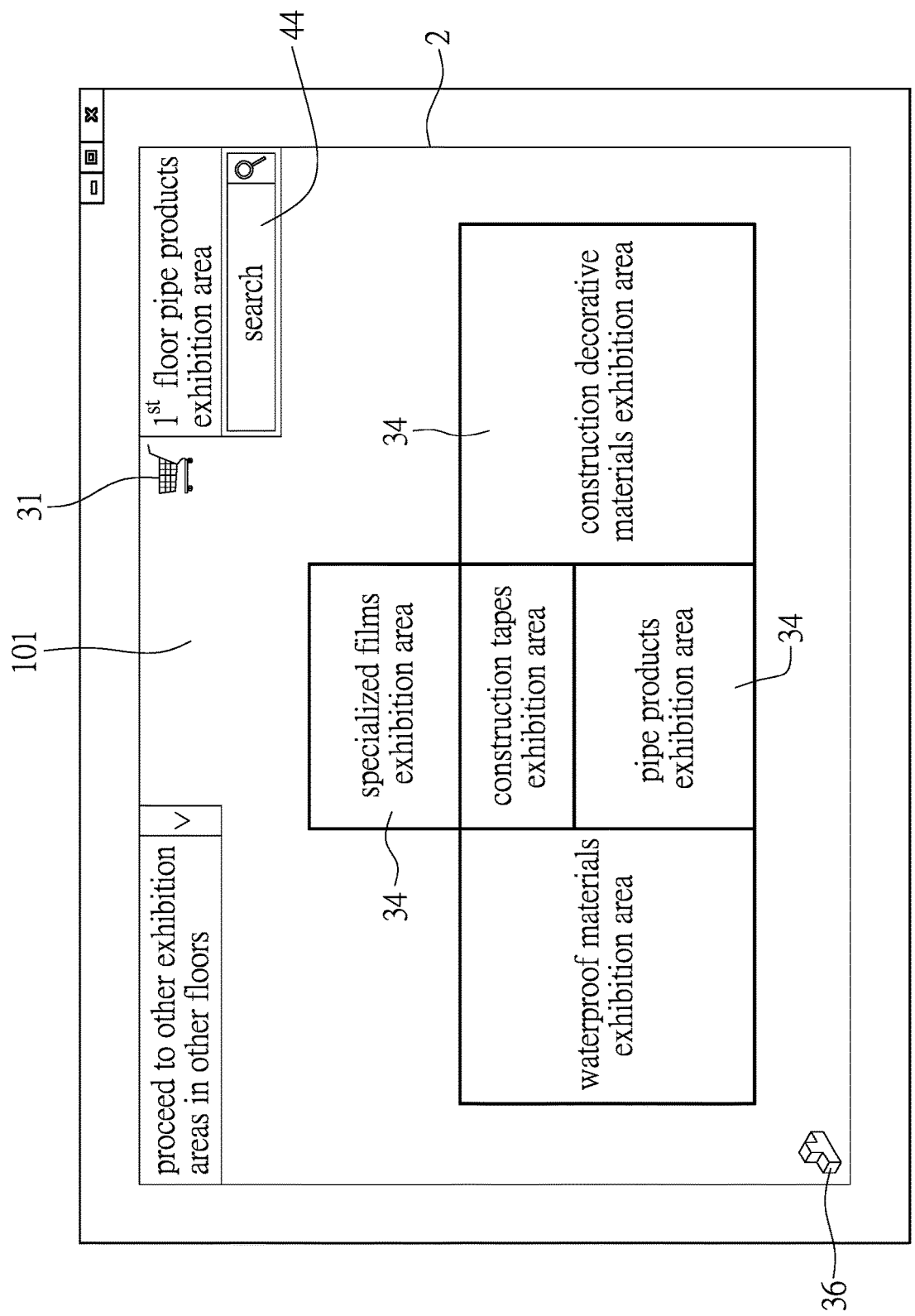

It is worth noting that, in the embodiment that the cloud-based shopping mall webpage 2 includes the plurality of exhibition sub-areas 34, the cloud-based shopping mall webpage 2 further includes a planar view switching option 35, and the cloud-based cyber shopping mall system A further includes a planar view switching module A8 that enables the cloud-based shopping mall webpage 2 to present an exhibition area planar view and the plurality of exhibition sub-area options 34 (i.e., "fireproof materials exhibition area", "specialized films exhibition area", "construction tapes exhibition area", "pipe products exhibition area", and "decorative building materials exhibition area" as shown in FIG. 10) corresponding to a current exhibition area panoramic photograph 10 when the planar view switching option 35 is clicked. Furthermore, when one of the exhibition sub-area options 34 is clicked, the planar view switching module A8 can control the cloud-based shopping mall webpage 2 to display the corresponding scene photographs 101 and at least one 3D product model 20. For example, when the user clicks on the "pipe products exhibition area" on the cloud-based shopping mall webpage 2 of FIG. 10, the cloud-based shopping mall webpage 2 is changed to the image as shown in FIG. 2. Naturally, when the cloud-based shopping mall webpage 2 displays an exhibition area planar view, the cloud-based shopping mall webpage 2 also correspondingly displays a perspective view switching option 36 for the user to switch back to the picture as shown in FIG. 1.

Figure 11:
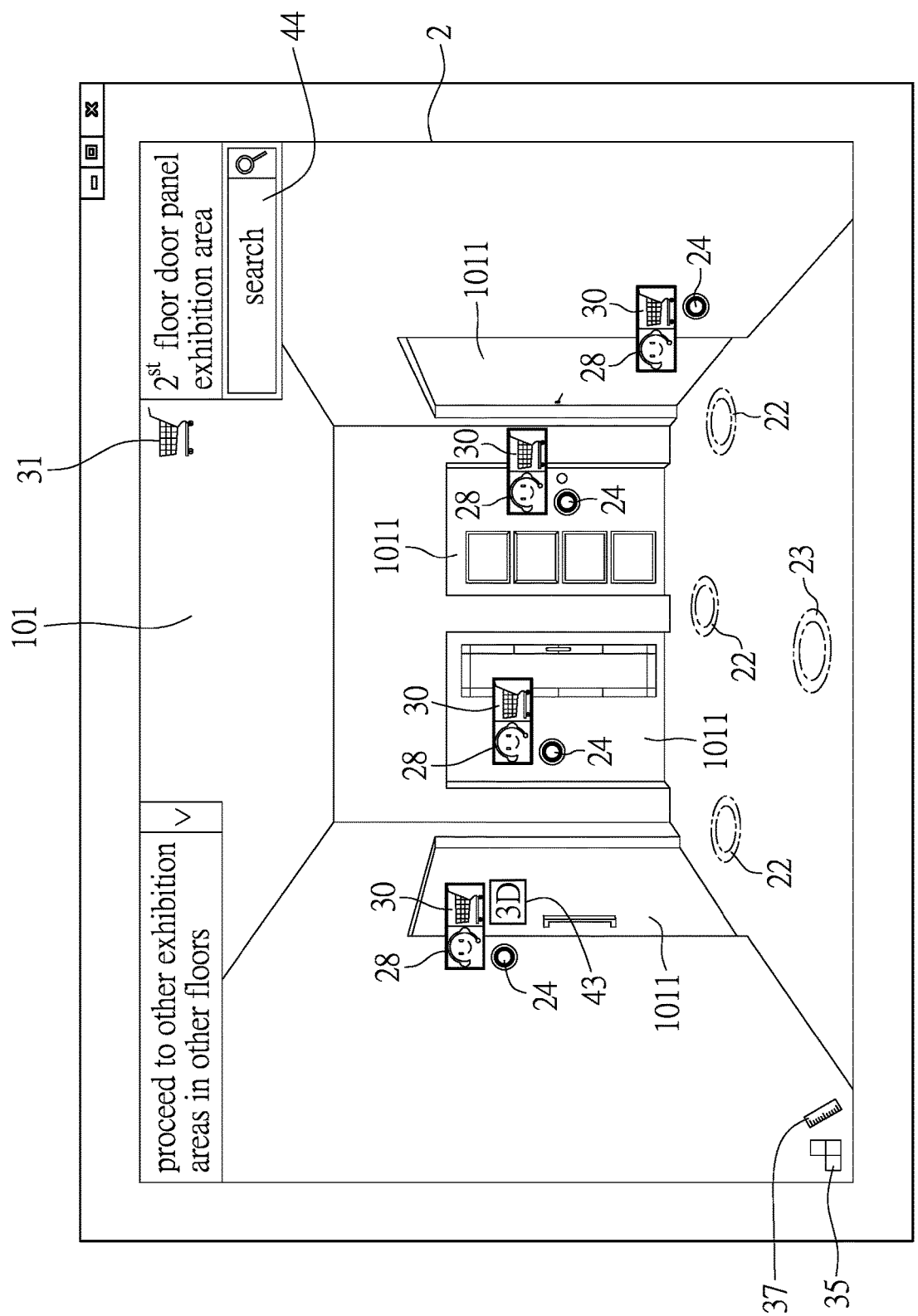

As shown in FIG. 1, FIG. 9 and FIG. 11, when the user clicks on the "$2^{nd}$ floor: lifestyle and leisure" exhibition area option 33 and then clicks on the "door panel" exhibition sub-area option 34 on the cloud-based shopping mall webpage 2 as shown in FIG. 9, the cloud-based shopping mall webpage 2 displays the picture in FIG. 10, and the user can click on any of the assisting mark 22, the product introduction option 24, the customer service option 28 or the shopping cart option 30 on the cloud-based shopping mall webpage 2 according to requirements.

Figure 12:
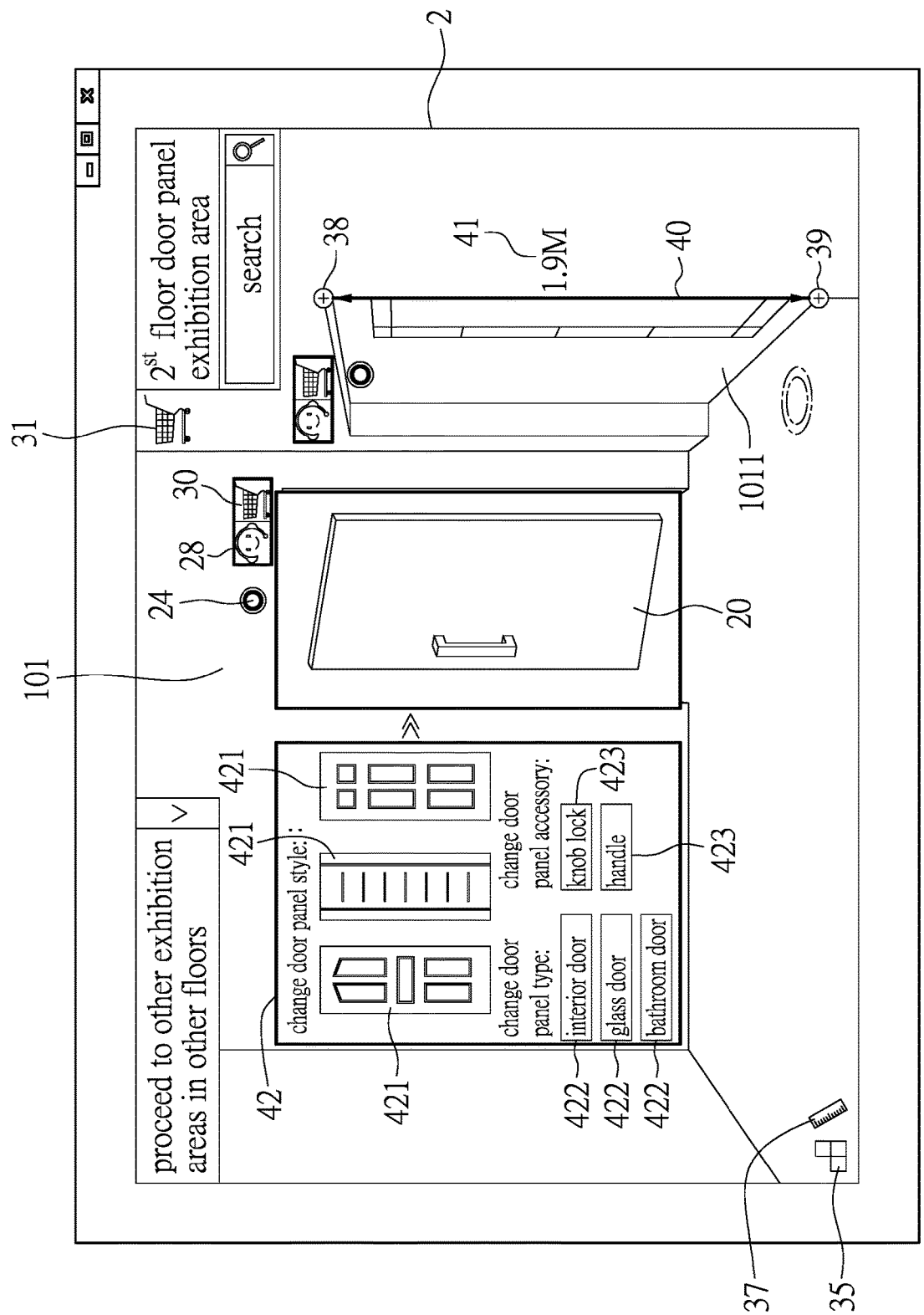

As shown in FIG. 11 and FIG. 12, if the user clicks on the assisting mark 22 on the left side of FIG. 11, the cloud-based shopping mall webpage 2 is switched to the picture as shown in FIG. 12. As shown in FIG. 12, the cloud-based shopping mall webpage 2 shows a schematic view of a portion of the scene photographs 101 and the aforementioned 3D product model 20 simultaneously.

In practical applications, each of the 3D product models 20 can overlap one of the preset products 1011 in one of the scene photographs 101, and the user browsing the cloud-based shopping mall webpage 2 by using the electronic apparatus B, when viewing the scene photographs 101, only views the 3D product model 20, but not the preset products 1011 that is overlapped. Naturally, in specific applications, the cloud-based shopping mall webpage 2 can also show the preset products 1011 and the 3D product model 20 of the scene photographs 101 simultaneously. By placing the 3D product model 20 on the corresponding preset product 1011 in the scene photographs 101, or by configuring the 3D product model 20 adjacent to the corresponding preset product 1011 in the scene photographs 101, the user can view the corresponding preset product 1011 even when the user cannot properly view the 3D product model 20 due to having a poor network connection or various other factors.

In different embodiments, when the manufacturer designs the physical exhibition area, a specific area can be designed to have no product, and then in at least one scene photograph 101 of the exhibition area panoramic photograph 10 that is obtained by using a 360-degree panoramic camera equipment on the physical exhibition area, a predetermined blank area is correspondingly shown, such that when the cloud-based shopping mall webpage 2 presents the 3D product model 20, the 3D product model 20 can be configured on the predetermined blank area of one of the at least one scene photograph 101. In this way, the manufacturer can update the 3D product model 20 at any time according to requirements.

Referring to FIG. 1 and FIG. 12, according to the above, in practical applications, the cloud-based cyber shopping mall system A can further include a 3D product model shelving module A9 for allowing a cloud-based mall webpage provider or at least one dealer to upload a new 3D product model 20 to the cloud-based database 1, and to update the cloud-based shopping mall webpage 2 accordingly. In practical applications, the 3D product model shelving module A9 can, for example, have a management interface (e.g., a webpage). According to a user operation, the management interface can correspondingly present one of the exhibition area panoramic photographs 10, and the management interface can also allow the user to operate, so that the user can drag and drop the new 3D product model 20 on a preset product 1011 or the predetermined blank area in one of the scene photographs 101 of the exhibition area panoramic photographs 10. Naturally, the management interface can also change different exhibition area panoramic photographs 10 according to the user operation, i.e., the user can configure the 3D product model 20 on the preset product 1011 in one of the scene photographs 101 of any exhibition area panoramic photographs 10 according to requirements.

As shown in FIG. 1 and FIG. 12, the cloud-based cyber shopping mall system A can further include a 3D product model adjustment module A10 that is used to detect the operations of the user on the electronic apparatus B, so as to change an angle of the at least one 3D product model 20 presented on the cloud-based shopping mall webpage 2. Specifically, the user can change an angle of the 3D product model 20 presented on the cloud-based shopping mall webpage 2 by clicking on the 3D product model 20 on the cloud-based shopping mall webpage 2 and moving a cursor 23 left and right, so that the user can clearly understand appearances of the 3D product model 20 from various angles.

Particularly, in various existing common shopping websites, a consumer can only see images or photographs of a product, and if the vendor does not provide images or photographs of the product from different angles, the consumer cannot tell the style of the product from other angles. On the other hand, through using the 3D product model adjustment module A10, the cloud-based cyber shopping mall system A of the present disclosure allows the user to clearly see the appearances of the product from various angles.

As shown in FIG. 1 and FIG. 12, in a preferable embodiment, the cloud-based cyber shopping mall system A further includes a size measurement module A11 that allows the user to measure an actual size corresponding to the at least one preset product 1011 or the at least one 3D product model 20 in the scene photographs 101. Specifically, the cloud-based shopping mall webpage 2 can include a size measurement option 37. When the size measurement option 37 is clicked, the size measurement module A11 tracks a position next clicked by the user in the scene photographs 101, and the size measurement module A11 then controls the cloud-based shopping mall webpage 2 to present a start position mark 38. The size measurement module A11 then tracks another position next clicked by the user in the scene photographs 101 and accordingly controls the cloud-based shopping mall webpage 2 to present an end position mark 39. Finally, the size measurement module A11 controls the cloud-based shopping mall webpage 2 to present a line segment 40 and a size mark 41 according to the scale of the current scene photographs 101 presented on the cloud-based shopping mall webpage 2 to the corresponding physical size of the scene photographs 101. Two ends of the line segment 40 are the start position mark 38 and the end position mark 39, and the size mark 41 is an actual size of the line segment 40 in the physical exhibition area.

In a common online shopping platform, if the vendor does not specifically describe a size of a product in a product description, the user cannot know an actual size of the product, thereby causing inconveniences to a consumer in purchasing. Furthermore, even if the vendor does provide the size of the product in the product description, if the consumer wants to know a size of a specific part of the product, he or she still cannot know directly from the online shopping platform. Accordingly, through the design of the size measurement module A11, the cloud-based cyber shopping mall system A of the present disclosure allows the user to directly measure an actual size of any object in the currently displayed scene photographs 101 on the cloud-based shopping mall webpage 2, thereby improving a willingness to purchase of the consumer.

As shown in FIG. 1 and FIG. 12, a style change module A12 is used to detect operations of the user on the electronic apparatus B to change a style (e.g., a pattern, a color, a texture, etc.) of one of the at least one 3D product model 20. Specifically, when the user clicks on the 3D product model 20 on the cloud-based shopping mall webpage 2 as shown in FIG. 12, the cloud-based shopping mall webpage 2 can correspondingly display a style change menu 42 that includes three door panel style options 421, three door panel type options 422, and two door panel accessory options 423, and the style change module A12 is used to detect which option of the style change menu 42 is clicked by the user, so as to control the cloud-based shopping mall webpage 2 to change a style of the 3D product model 20.

Figure 13:
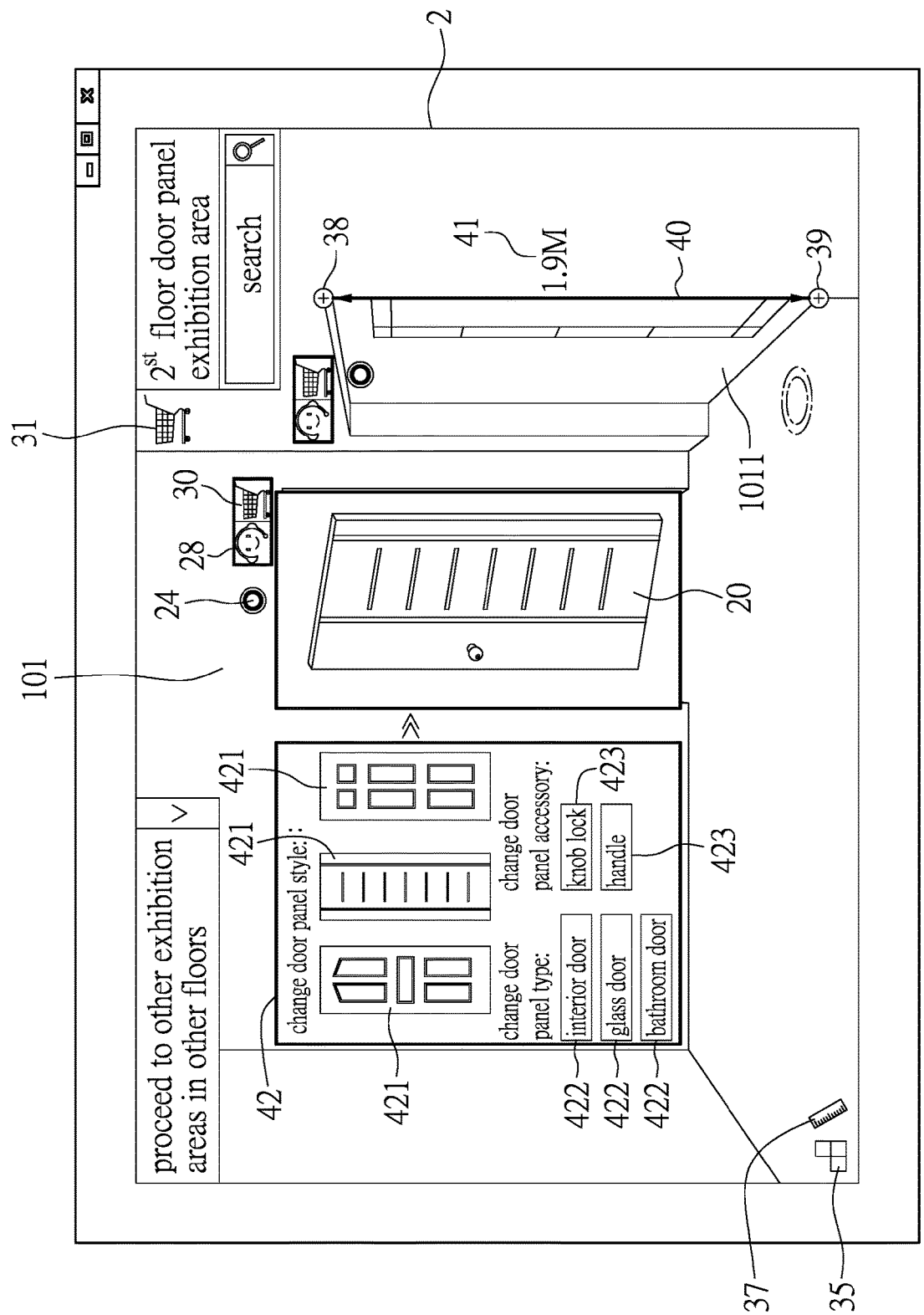

Specifically, as shown in FIG. 12 and FIG. 13, if the user clicks on the two options of "door style in the middle" and "knob lock" in the style change menu 42 on the cloud-based shopping mall webpage 2 as shown in FIG. 12, the style change module A12 controls the cloud-based shopping mall webpage 2 to switch from the picture as shown in FIG. 12 to the picture as shown in FIG. 13, such that the user can see different styles of door panels including knob locks in the picture as shown in FIG. 13.

According to the above, the cloud-based cyber shopping mall system A of the present disclosure, through the design of the 3D product model 20 and the style change module A12, allows the user to change the style of the 3D product model 20 according to requirements, so that the user can clearly understand the appearance of the 3D product model 20 in different styles. In existing common shopping webpages, unless the vendor provides photos of different combinations of products, the user must imagine combinations of different styles of products matching with each other, which causes confusion for the user in making a selection.

As shown in FIG. 11, it is worth mentioning that in actual applications, the cloud-based shopping mall webpage 2 can include a plurality of 3D display options 43, and the cloud-based cyber shopping mall system A can include a 3D product model display switching module A13. The 3D product model display switching module A13 is used to detect whether or not any of the 3D display options 43 is clicked. If the 3D product model display switching module A13 determines that one of the 3D display options 43 is clicked, the 3D product model display switching module A13 controls the cloud-based shopping mall webpage 2 to present the corresponding 3D product model 20. Specifically, in the picture as shown in FIG. 11, if the user clicks on the "3D" mark (i.e., one of the 3D display options 43), the user can see the 3D product model 20 as shown in FIG. 12. The design of the 3D display options 43 and the 3D product model display switching module A13, etc., allows the user to browse the cloud-based shopping mall webpage 2 more smoothly.

It should be particularly noted that, the 3D product model 20 of the cloud-based cyber shopping mall system A of the present disclosure is set on the scene photographs 101, therefore, after the user changes the style of the 3D product model 20 on the cloud-based shopping mall webpage 2, the user can not only see the 3D product model 20 in different styles, but can also clearly see how the 3D product model 20 and the preset products 1011 in other scene photographs 101 match with each other. For example, the cloud-based cyber shopping mall system A of the present disclosure can be applied to an online sample house navigation, the 3D product models 20 can be various large appliances or large furniture, and the user can not only visit the interior of a house in a VR manner, but can also change the appearance of the large appliances or large furniture configured in the house by operating the cloud-based shopping mall webpage 2. In this way, house buyers can clearly feel the relation between the appliances or furniture that has different appearances matching with the decoration.

In everyday lives, generally, when a buyer visits a large-scale trade show, the buyer views products exhibited in booths of each of the exhibition areas along a path. When a buyer is interested in products of a particular booth, the buyer stops at the booth and directly contacts personnel of the booth, afterwards, the buyer can directly place an order at the booth. The buyer can view products of different styles exhibited by the manufacturer, or products of different styles matched with each other and exhibited by the manufacturer. In addition, the buyer can also ask the manufacturer to match products of different styles with each other to understand how the two products match. Accordingly, the cloud-based cyber shopping mall system A of the present disclosure enables the user browsing the cloud-based shopping mall webpage 2 to switch between different scene photographs 101 or different exhibition area panoramic photographs 10 according to requirements, and when the user is interested in any of the preset products 1011 displayed on the cloud-based shopping mall webpage 2, the user can directly click on the shopping cart option 30 or the customer service option 28 located adjacent to the preset product 1011, so that the user can instantly place an order or obtain related assistances. The user can change the style of the 3D product model 20 on the cloud-based shopping mall webpage 2 according to requirements, and the user can clearly understand an actual appearance of the 3D product model 20 in different styles. Therefore, the cloud-based cyber shopping mall system A of the present disclosure can provide the users with the exact same experience as participating in offline large-scale trade shows.

In addition, the exhibition area switching module A7 in the cloud-based cyber shopping mall system A of the present disclosure allows the user to switch to different exhibition areas according to requirements, and relevant personnel can obtain an experience similar to that of visiting a department store. In actual applications, one plastic product manufacturer can produce thousands of products, but consumers may only know dozens of products, and the cloud-based cyber shopping mall system A of the present disclosure enables the user to understand what other products the plastic product manufacturer provides through the design of the exhibition area switching module A7, etc., so that an overall sales performance of the plastic product manufacturer can be improved. In addition, the user can also have a one-stop shopping experience.

Reference is further made to FIG. 1 and FIG. 2, in a preferable embodiment, the cloud-based shopping mall webpage 2 further includes a search box 44, and the cloud-based cyber shopping mall system A further includes a keyword module A14. According to a keyword entered by the user in the search box 44, the keyword module A14 determines whether any of the at least one 3D product model 20 or any of the at least one preset product 1011 corresponding to the keyword is in a database, and if any of the at least one 3D product model 20 or any of the at least one preset product 1011 corresponding to the keyword is in the database, the keyword module A14 controls the cloud-based shopping mall webpage 2 to replace contents that are currently presented, so as to present the corresponding one of the scene photographs 101 or the corresponding one of the at least one 3D product model 202.

Figure 14:
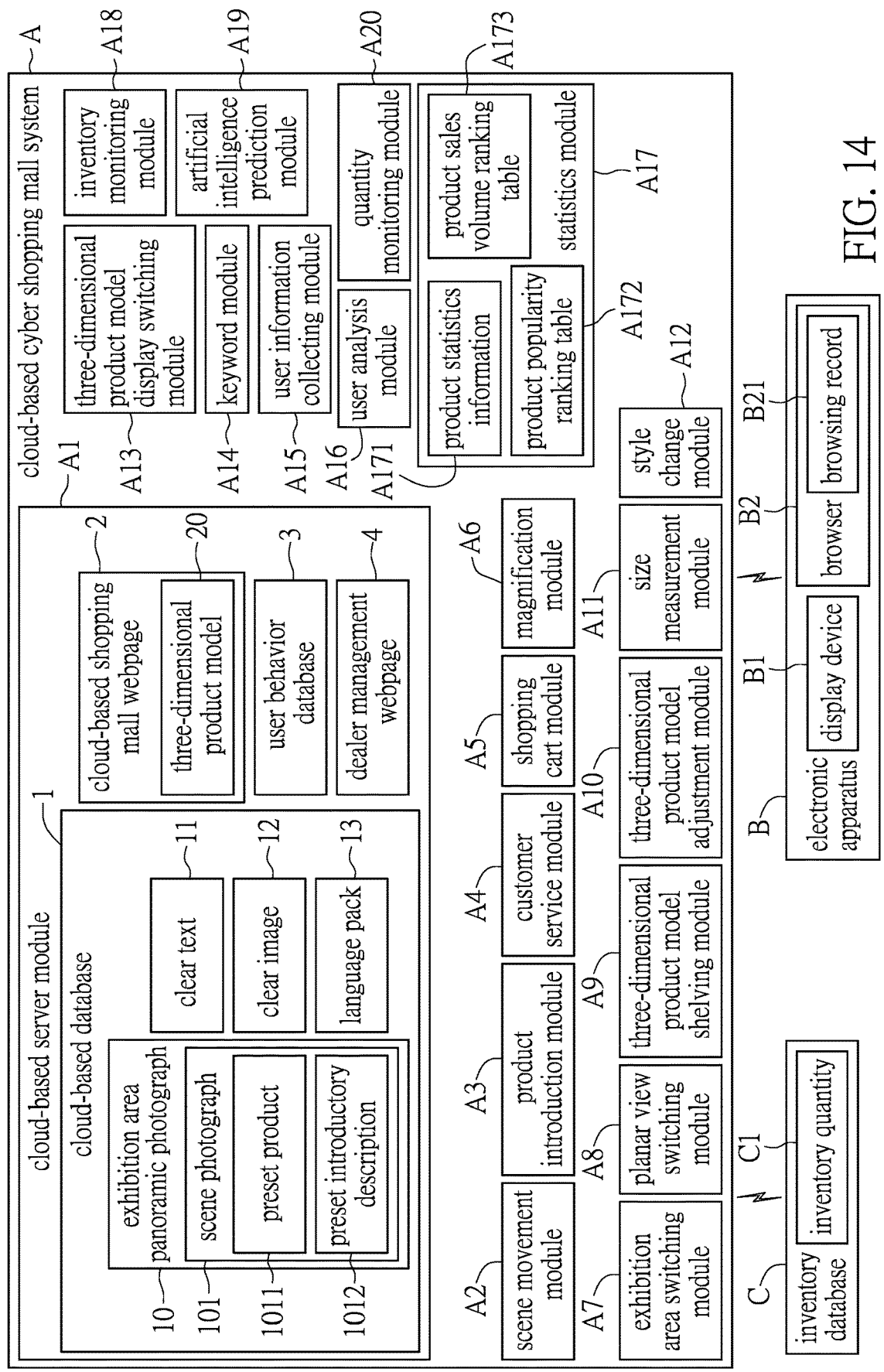
FIG. 14 is a schematic block diagram of the cloud-based cyber shopping mall system according to a second embodiment of the present disclosure.

Referring to FIG. 14, FIG. 14 is a schematic block diagram of the cloud-based cyber shopping mall system A according to a second embodiment of the present disclosure. The biggest difference between the current embodiment and the previous embodiment is that, the cloud-based cyber shopping mall system A further includes a user information collection module A15 and a user analysis module A16. The user information collection module A15 collects a network address (i.e., Internet protocol (IP) address) of the electronic apparatus B that is connected to the cloud-based server module A1, the user analysis module A16 determines a country of the user based on the network address, and loads a corresponding language pack 13 from the cloud-based database 1, so that the cloud-based shopping mall webpage 2 displays any of the order form 29, the text introduction 25, the webpage link 26, the product production video 27, the clear text 11, the dealer contact information 281, and the online customer service link 282 in a corresponding language used in the country of the user. In other words, when a user from a different country connects to the cloud-based shopping mall webpage 2, the user information collection module A15 and the user analysis module A16 determines the corresponding country of the user, and enables the cloud-based shopping mall webpage 2 to present various contents in a corresponding language, so that the viewing experience of the user can be further improved.

In practical applications, the customer service module A4 can load determination results of the user analysis module A16 on the country of the user to determine if a dealer is in the country of the user. If the customer service module A4 determines that the country of the user has no dealer, the customer service module A4 enables the cloud-based shopping mall webpage 2 to display at least one of the dealer contact information 281 that is closest to the country of the user and the online customer service link 282. For example, if the user analysis module A16 determines that a connection of the user is from the Philippines, and the user clicks on a customer service option 28 on the cloud-based shopping mall webpage 2 corresponding to a preset product 1011 that no dealer is located in the Philippines, the customer service module A4 can correspondingly look up which dealer that sells the preset product 1011 is closest to the Philippines, assuming that the nearest country to the Philippines having a dealer selling the preset product 1011 is Taiwan, the customer service module A4 then controls the cloud-based shopping mall webpage 2 to display the dealer contact information 281 for the Taiwan dealer of the preset product 1011. Naturally, the customer service module A4 can also enable the cloud-based shopping mall webpage 2 to display a relevant notification message (e.g., "Sorry, there is no dealer selling this preset product in your country, the Philippines. The following is the contact information of the closest dealer to you, or you can try contacting online customer service").

The user analysis module A16 can also be used to track and record which of the exhibition area panoramic photographs 10 are viewed, which of the scene photographs 101 are viewed, time spent on viewing each of the scene photographs 101, whether or not any of the shopping cart options 30 is clicked, whether or not any of the product introduction options 24 is clicked, whether or not any of the customer service options 28 is clicked, and whether or not any of the order form 29 is filled, and when the user browses the cloud-based shopping mall webpage 2, a user behavior information A161 is formed to store the user behavior information A161 in a user behavior database 3 in the cloud-based server module A1. Naturally, according to requirements, the user analysis module A16 can also be used to track other actions of the user when the user browses the cloud-based shopping mall webpage 2, and is not limited to the above descriptions.

The cloud-based cyber shopping mall system further includes a statistics module A17 for analyzing browsing data respectively corresponding to the plurality of users connected to the cloud-based shopping mall webpage 2 to calculate a number of times each of the at least one preset product 1011 is clicked, a number of times each of the at least one 3D product model 20 is clicked, a number of times each of the at least one preset product 1011 is ordered, a quantity of each of the at least one preset product 1011 ordered, a number of times each of the at least one 3D product model 20 is ordered, a quantity of each of the at least one 3D product model 20 ordered, a click-through rate of each of the at least one preset product 1011, a click-through rate of each of the at least one 3D product model 20, a total time the users spent on viewing each of the at least one preset product 1011, and a total time the users spent on viewing each of the at least one 3D product model 20, so as to generate product statistics information A171 corresponding to each of the at least one preset product 1011, product statistics information A171 corresponding to each of the at least one 3D product model 20, a product popularity ranking table A172, and a product sales volume ranking table A173. In practical applications, according to requirements, the user analysis module A16 and the statistics module A17 can be used to statistically analyze various data (e.g., a click-through rate of each of the preset products 1011, a number of visits of each of the preset products 1011, a number of inquiries of each of the preset products 1011, a location distribution of visitors, and the click-through rate of the keywords, etc.) when the user browses the cloud-based shopping mall webpage 2. For example, the statistics module A17 may also provide statistics on the relevant browsing or consumption behavior of consumers in different regions, so as to effectively help dealers in different regions to more accurately understand the consumers in the regions of the dealers.

In practical applications, the cloud-based server module A1 further includes a dealer management webpage 4. The dealer can connect to the dealer management webpage 4 by using the electronic apparatus B, so as to load the product statistics information A171 corresponding to each of the at least one preset product 1011 and the product statistics information A171 corresponding to each of the at least one 3D product model 20 generated by the statistics module A17. Therefore, each of the dealers can know the popularity and sales volumes of the products sold by the dealers on the cloud-based shopping mall webpage 2, and evaluate whether to adjust the marketing strategy or perform restocking.

In practical applications, the cloud-based cyber shopping mall system A can also include an inventory monitoring module A18 connected to an inventory database C of the dealer of each of the at least one preset product 1011 and connected to an inventory database C of the dealer of each of the at least one 3D product model 20. The inventory monitoring module A18 monitors whether or not an inventory quantity C1 of the inventory database C of each of the dealer is lower than a preset value, and when the inventory quantity C1 corresponding to any of the at least one preset product 1011 or any of the at least one 3D product model 20 is lower than the preset value, the inventory monitoring module A18 sends a notification to the corresponding dealer, so as to notify the dealer that a specific product is nearly sold out and needs to be restocked in advance.

Accordingly, in practical applications, although a dealer can know the sales volume or the popularity of each of the products through the dealer management webpage 4, however, the cloud-based shopping mall webpage 2 is constantly online for users from anywhere in the world to view, and it is difficult for dealer to continually monitor the sales status of the products through the dealer management webpage 4. Therefore, through the design of the inventory monitoring module A18, the cloud-based cyber shopping mall system A of the present disclosure can instantly notify the dealer of the current sales status, and can significantly reduce the chance of the dealer having no inventory available for sale due the dealer not monitoring the sales volume of the products through the dealer management webpage 4.

In a preferable application, the cloud-based cyber shopping mall system further includes an artificial intelligence (AI) prediction module A19 that is used to predict a sales volume of each of the at least one preset product 1011 in a next period based on the product popularity ranking table A172 and the product sales volume ranking table A173. In different embodiments, the dealer can also connect to the dealer management webpage 4 via the electronic apparatus B to view the prediction made by the AI prediction module A19 on the sales volume of each of the products (i.e., the aforementioned preset product 1011 and 3D product model 20) sold by the dealer in the next period, and the dealer can more objectively assess whether or not additional inventories are required. The AI prediction module A19 can be any prediction model or software that uses machine learning and other technologies to predict future development using existing data.

Accordingly, the cloud-based cyber shopping mall system A can further include a quantity monitoring module A20 connected to a plurality of inventory databases C, according to the sales volume of each of the at least one preset product 1011 in the next period predicted by the AI prediction module A19, a sales volume of each of the at least one 3D product model 20 in the next period predicted by the AI prediction module A19, an inventory quantity C1 in the inventory database C corresponding to each of the at least one preset product 1011, and an inventory quantity C1 in the inventory database C corresponding to each of the at least one 3D product model 20, the quantity monitoring module A20 determines whether to notify the dealer corresponding to any of the at least one preset product 1011 and any of the at least one 3D product model 20 to restock in advance. In practical applications, the quantity monitoring module A20 can notify the dealer through means such as an e-mail or a short message service.

In the existing common shopping sites, a consumer often sees that the product he/she wants to buy is in a status of "restocking, not for purchase", therefore, the consumer then turns to other shopping sites to purchase the product. Through the design of the AI prediction module A19 and the quantity monitoring module A20, the cloud-based cyber shopping mall system A of the present disclosure can notify the dealer in advance to restock before the product in the inventory of the dealer is completely sold out, so that the problem of an insufficient stock for when the user browses the cloud-based shopping mall webpage 2 and wants to place an order for one of the preset product 1011 can be greatly reduced.

It is worth noting that, in practical applications, the cloud-based cyber shopping mall system A further includes a browsing apparatus detection module that is used to correspondingly change a layout of the cloud-based shopping mall webpage 2 according to a screen resolution and a screen ratio of the electronic apparatus B. In other words, a user may not see the same layout when browsing the cloud-based shopping mall webpage 2 with the electronic apparatus B including display devices B1 of different sizes, such as mobile phones, tablet computers, desktop computers, televisions, etc., so that the user can have a relatively better viewing experience when viewing via the display devices B1 of different sizes.

In conclusion, the cloud-based cyber shopping mall system of the present disclosure allows users to go online and view products exhibited in each of the exhibition areas at any time, and the user can have an experience similar to that of visiting a physical exhibition venue. For example, the user can directly click on the shopping cart option or the customer service option adjacent to the product that the user wants to buy, so as to instantly place an order or obtain service. The user can clearly see the style and appearance of the product from different angles through the 3D product model. Furthermore, the user can replace a style of the 3D product model, so as to understand appearances of the product in different styles. Since the 3D product model is directly configured in front of the scene photographs, the user can directly feel how the 3D product model is configured in a physical exhibition scene. The cloud-based cyber shopping mall system of the present disclosure also allows users to switch different exhibition area panoramic photographs and corresponding 3D product models, so that the user can purchase all products that are required in one place. The cloud-based cyber shopping mall system of the present disclosure can be applied to various fields, such as various large-scale manufacturers (specifically, manufacturers that produce multiple products at the same time), various trade shows, virtual application of a physical department store, and real estate brokers.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A cloud-based cyber shopping mall system, comprising:

a cloud-based server module including a cloud-based database and a cloud-based shopping mall webpage, the cloud-based database storing a plurality of exhibition area panoramic photographs, each of the exhibition area panoramic photographs being pieced together from a plurality of scene photographs, and each of the scene photographs including at least one preset product and at least one preset introductory description; wherein the cloud-based server module allows an electronic apparatus of one of a plurality of users to be connected thereto, so that the electronic apparatus displays the cloud-based shopping mall webpage, and the cloud-based shopping mall webpage presents a portion of the scene photographs and at least one three-dimensional (3D) product model of one of the exhibition area panoramic photographs;

a 3D product model adjustment module used to detect operations of the one of the plurality of users on the electronic apparatus, so as to change an angle of the at least one 3D product model presented on the cloud-based shopping mall webpage;

a scene movement module used to detect the operations of the one of the plurality of users on the electronic apparatus to change at least one of the scene photographs in the one of the exhibition area panoramic photographs presented on the cloud-based shopping mall webpage, and to correspondingly change or move a position of the at least one 3D product model;

a style change module used to detect the operations of the one of the plurality of users on the electronic apparatus to change a style of one of the at least one 3D product model;

an exhibition area switching module used to detect the operations of the one of the plurality of users on the electronic apparatus to replace the one of the exhibition area panoramic photographs and the at least one 3D product model that are presented on the cloud-based shopping mall webpage;

a shopping cart module used to detect the operations of the one of the plurality of users on the electronic apparatus, so that an order form corresponding to one of the at least one preset product or the one of the at least one 3D product model is displayed on the cloud-based shopping mall webpage;

a product introduction module used to detect the operations of the one of the plurality of users on the electronic apparatus, so that at least one of a text introduction, a webpage link, or a product production video corresponding to the one of the at least one preset product or the one of the at least one 3D product model is displayed on the cloud-based shopping mall webpage;

a magnification module used to detect the operations of the one of the plurality of users on the electronic apparatus, so that one of a clear text pre-stored in the cloud-based database and a clear image pre-stored in the cloud-based database corresponding to the at least one preset introductory description is displayed on the cloud-based shopping mall webpage; and a customer service module used to detect the operations of the one of the plurality of users on the electronic apparatus, so that at least one of a dealer contact information, or an online customer service link corresponding to the one of the at least one preset product or the one of the at least one 3D product model is displayed on the cloud-based shopping mall webpage.

2. The cloud-based cyber shopping mall system according to claim 1, wherein the cloud-based cyber shopping mall system further comprises a size measurement module allowing the one of the plurality of users to measure an actual size corresponding to the at least one preset product or the at least one 3D product model in the scene photographs.

3. The cloud-based cyber shopping mall system according to claim 1, wherein the cloud-based shopping mall webpage has a plurality of shopping cart options, each of the shopping cart options is configured adjacent to the one of the at least one preset product or the one of the at least one 3D product model in the plurality of scene photographs currently displayed by the cloud-based shopping mall webpage, and according to one of the shopping cart options selected by the one of the plurality of users on the electronic apparatus, the shopping cart module enables the cloud-based shopping mall webpage to display the corresponding order form; wherein the cloud-based shopping mall webpage has a plurality of product introduction options, each of the product introduction options is configured adjacent to the one of the at least one preset product or the one of the at least one 3D product model in the plurality of scene photographs currently displayed by the cloud-based shopping mall webpage, and according to one of the product introduction options selected by the one of the plurality of users on the electronic apparatus, the product introduction module enables the cloud-based shopping mall webpage to display at least one of the corresponding text introduction, the webpage link, or the product production video; wherein the cloud-based shopping mall webpage has a plurality of customer service options, each of the customer service options is configured adjacent to the one of the at least one preset product or the one of the at least one 3D product model, and according to one of the customer service options selected by the one of the plurality of users on the electronic apparatus, the customer service module enables the cloud-based shopping mall webpage to display at least one of the corresponding dealer contact information and the online customer service link.

4. The cloud-based cyber shopping mall system according to claim 3, wherein the cloud-based cyber shopping mall system further comprises a user analysis module for tracking and recording which of the exhibition area panoramic photographs are viewed, which of the scene photographs are viewed, time spent on viewing each of the scene photographs, whether or not any of the shopping cart options is clicked, whether or not any of the product introduction options is clicked, whether or not any of the customer service options is clicked, and whether or not any of the order form is filled, and when the one of the plurality of users browses the cloud-based shopping mall webpage, a user behavior information is formed to store the user behavior information in a user behavior database included in the cloud-based server module.

5. The cloud-based cyber shopping mall system according to claim 1, wherein the cloud-based cyber shopping mall system further comprises an inventory monitoring module connected to an inventory database of at least one dealer of each of the at least one preset product and connected to an inventory database of the at least one dealer of each of the at least one 3D product model, the inventory monitoring module monitors whether or not an inventory quantity of the inventory database of each of the at least one dealer is lower than a preset value, wherein, when the inventory quantity corresponding to any of the at least one preset product or any of the at least one 3D product model is lower than the preset value, the inventory monitoring module sends a notification to the corresponding at least one dealer.

6. The cloud-based cyber shopping mall system according to claim 1, wherein the cloud-based shopping mall webpage further includes a search box, and the cloud-based cyber shopping mall system further comprises a keyword module, according to a keyword entered by the one of the plurality of users in the search box, the keyword module determines whether any of the at least one 3D product model or any of the at least one preset product corresponding to the keyword is in the cloud-based database, and if any of the at least one 3D product model or any of the at least one preset product corresponding to the keyword is in the cloud-based database, the keyword module controls the cloud-based shopping mall webpage to replace contents that are currently presented, so as to present a corresponding one of the scene photographs or a corresponding one of the at least one 3D product model.

7. The cloud-based cyber shopping mall system according to claim 6, wherein the cloud-based cyber shopping mall system further comprises a 3D product model shelving module for allowing a cloud-based shopping mall webpage provider or at least one dealer to upload a new 3D product model to the cloud-based database and to update the cloud-based shopping mall webpage accordingly.

8. The cloud-based cyber shopping mall system according to claim 1, wherein the electronic apparatus of the one of the plurality of users loads the cloud-based shopping mall webpage through a browser, and the scene movement module loads a browsing record of the browser to determine whether or not the one of the plurality of users has browsed the cloud-based shopping mall webpage, when the scene movement module determines that the one of the plurality of users has browsed the cloud-based shopping mall webpage, based on the browsing record, the cloud-based shopping mall webpage is controlled to present the scene photographs and the at least one 3D product model that are last browsed by the one of the plurality of users.

9. The cloud-based cyber shopping mall system according to claim 1, wherein the cloud-based shopping mall webpage further includes a planar view switching option, the cloud-based cyber shopping mall system further comprising a planar view switching module that enables the cloud-based shopping mall webpage to present an exhibition area planar view corresponding to a current exhibition area panoramic photograph when the planar view switching option is clicked.

* * * * *